United States Patent
Takashima et al.

(10) Patent No.: US 11,398,060 B2
(45) Date of Patent: Jul. 26, 2022

(54) INFORMATION PROCESSING DEVICE, INFORMATION PROCESSING METHOD, AND PROGRAM

(71) Applicant: Sony Group Corporation, Tokyo (JP)

(72) Inventors: Masatoshi Takashima, Tokyo (JP); Tetsu Ogawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 48 days.

(21) Appl. No.: 16/495,041

(22) PCT Filed: Feb. 7, 2018

(86) PCT No.: PCT/JP2018/004234
§ 371 (c)(1),
(2) Date: Sep. 17, 2019

(87) PCT Pub. No.: WO2018/186016
PCT Pub. Date: Oct. 11, 2018

(65) Prior Publication Data
US 2020/0258265 A1 Aug. 13, 2020

(30) Foreign Application Priority Data

Apr. 5, 2017 (JP) .............................. JP2017-075043

(51) Int. Cl.
*G06T 11/00* (2006.01)
*G06T 7/70* (2017.01)

(52) U.S. Cl.
CPC ................ *G06T 11/00* (2013.01); *G06T 7/70* (2017.01)

(58) Field of Classification Search
CPC ... G06T 3/00; G06T 11/00; G06T 7/70; G06T 1/00; H04N 5/232; H04N 5/222; G06K 9/00657; G06K 2009/2045
See application file for complete search history.

(56) References Cited

U.S. PATENT DOCUMENTS

| | | | |
|---|---|---|---|
| 8,687,062 B1* | 4/2014 | Reece | G03B 15/006 348/144 |
| 2005/0134699 A1* | 6/2005 | Nagashima | G02B 13/0055 348/218.1 |

(Continued)

FOREIGN PATENT DOCUMENTS

| JP | 2000156818 A | 6/2000 |
|---|---|---|
| JP | 2011234121 A | 11/2011 |

(Continued)

OTHER PUBLICATIONS

Baoxi N Hu et al., "The Frequent Image Frames Enhanced Digital Orthorectified Mapping (FIFEDOM) Camera for Acquiring Multiangular Reflectance From the Land Surface", IEEE Transactions on Geoscience and Remote Sensing, IEEE Service Center, Piscataway, NJ, US, vol. 45, No. 10, Oct. 1, 2007 (Oct. 1, 2007), pp. 3110-3118, XP011192514, ISSN: 0196-2892, DOI: 10.1109/TGRS.2007.904917.

(Continued)

*Primary Examiner* — Syed Haider
(74) *Attorney, Agent, or Firm* — Michael Best & Friedrich LLP

(57) ABSTRACT

An object is to provide, for synthetic information such as synthetic images, images with few errors. Thus, for an acquired image including information regarding a specific wavelength region, for example, an image of a specific region corresponding to a specific positional range in a captured image is extracted. A plurality of pieces of information regarding the specific region extracted from respective captured images captured at different points in time is synthesized to generate a synthetic information. By performing synthesis on the captured images captured at the different points in time during movement, synthetic information with few errors is obtained from an object spanning a wide range.

16 Claims, 18 Drawing Sheets

(56) References Cited

U.S. PATENT DOCUMENTS

| | | | | |
|---|---|---|---|---|
| 2011/0135161 A1* | 6/2011 | Koutsky | ............... | G01N 35/04 382/110 |
| 2012/0218437 A1* | 8/2012 | Hermary | ............. | G01B 11/245 348/222.1 |
| 2015/0160450 A1* | 6/2015 | Ou | ...................... | G02B 21/367 348/80 |
| 2016/0232650 A1* | 8/2016 | Christ | ....................... | G01J 3/28 |
| 2017/0374323 A1* | 12/2017 | Gornik | ................ | A01B 79/005 |

FOREIGN PATENT DOCUMENTS

| | | |
|---|---|---|
| JP | 2012191486 A | 10/2012 |
| JP | 5162890 B2 | 12/2012 |
| JP | 2014011782 A | 1/2014 |

OTHER PUBLICATIONS

Tatjana Koukal et al. "Potential of Multi-Angular Data Derived From a Digital Aerial Frame Camera for Forest Classification", IEEE Journal of Selected Topics in Applied Earth Observations and Remote Sensing, IEEE, USA, vol. 5, No. I, Feb. 1, 2012 (Feb. 1, 2012), pp. 30-43, XP011423835, ISSN: 1939-1404, DOI: 10.1109/JSTARS.2012.2184527.

Extended European Search Report dated Mar. 16, 2020 for corresponding European Application No. 18780366.3.

\* cited by examiner

FIG. 7
A
FIRST INCIDENT-ANGLE IMAGE
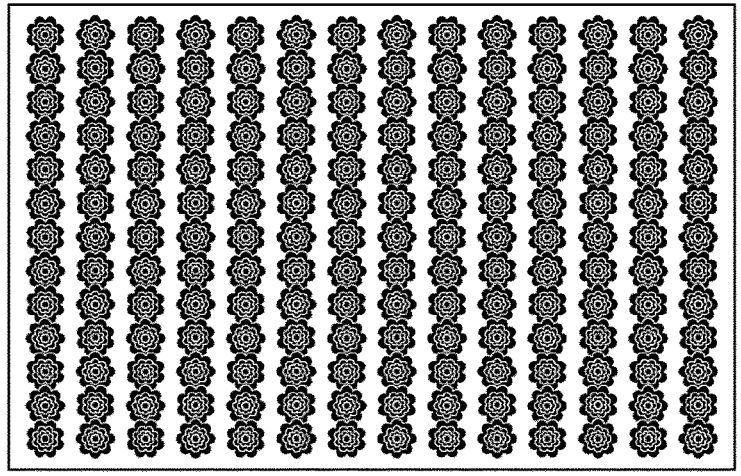
B
SECOND INCIDENT-ANGLE IMAGE
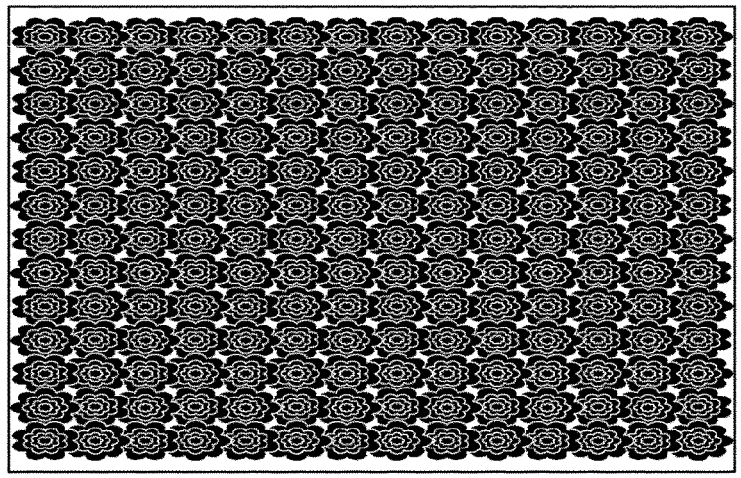
C
IMAGE IN COMPARATIVE EXAMPLE
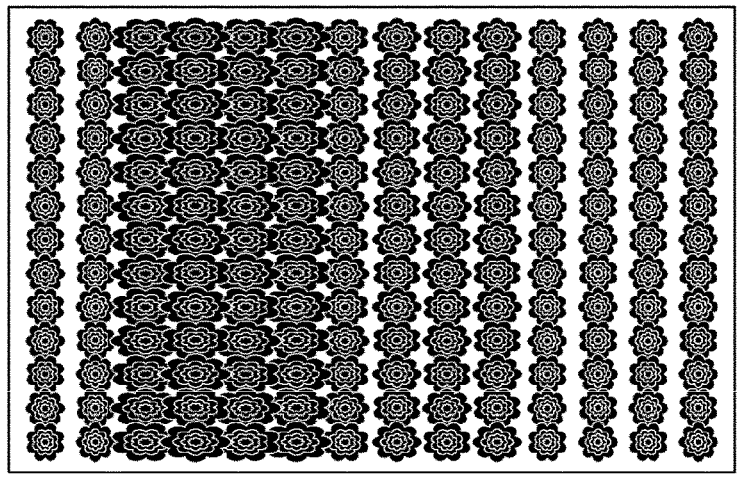

FIRST INCIDENT-ANGLE IMAGE

| AR7 (t7) | AR6 (t6) | AR5 (t5) | AR4 (t4) | AR3 (t3) | AR2 (t2) | AR1 (t1) |
|---|---|---|---|---|---|---|

B

SECOND INCIDENT-ANGLE IMAGE

| AR7 (t5) | AR6 (t4) | AR5 (t3) | AR4 (t2) | AR3 (t1) | AR2 (t0) | AR1 (t-1) |
|---|---|---|---|---|---|---|

FIG.13
A
B
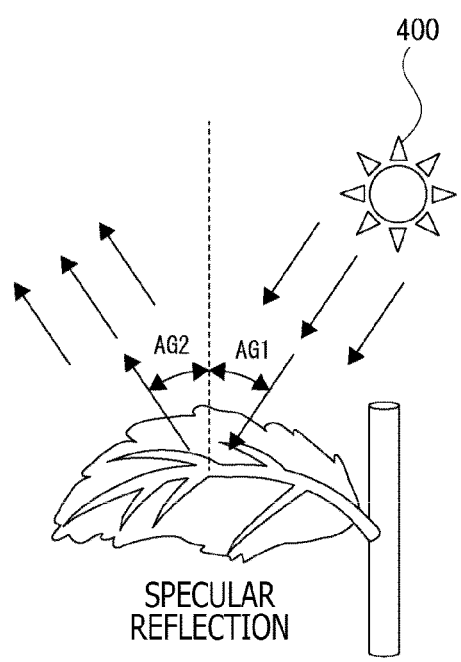

FIG.15
A    B
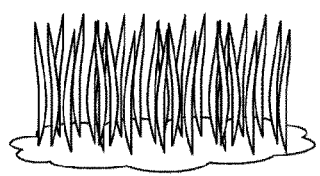
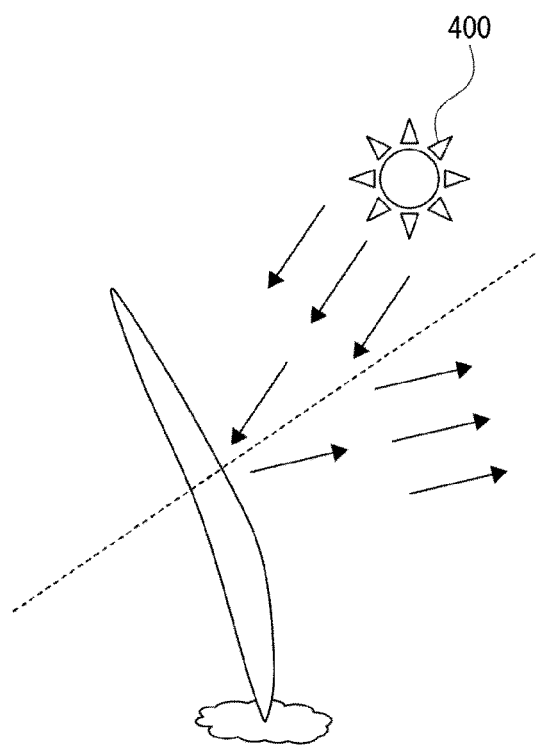
SPECULAR REFLECTION

FIG.17
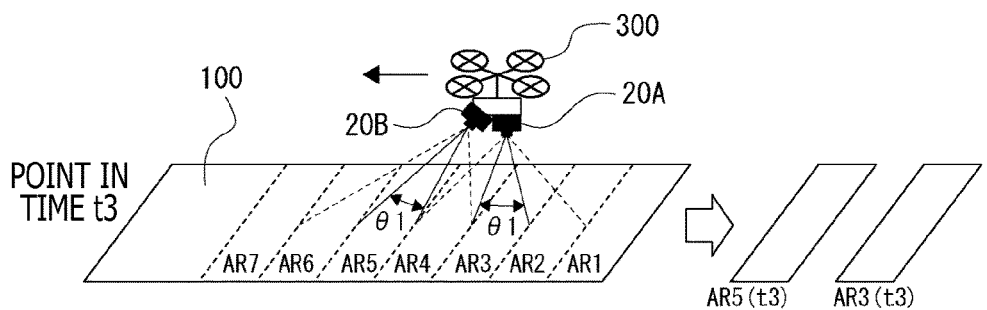
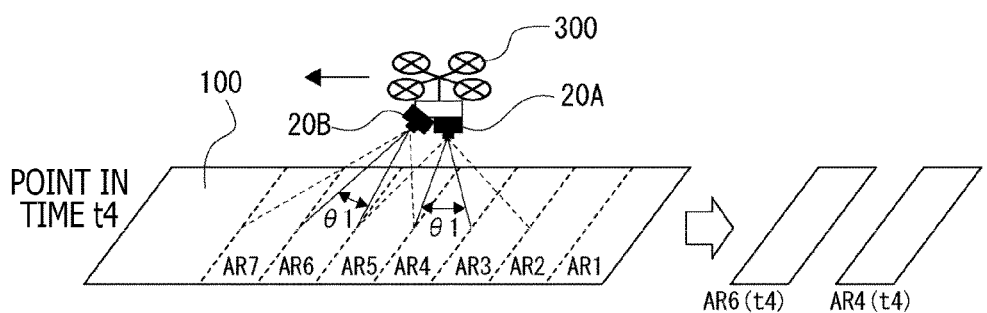
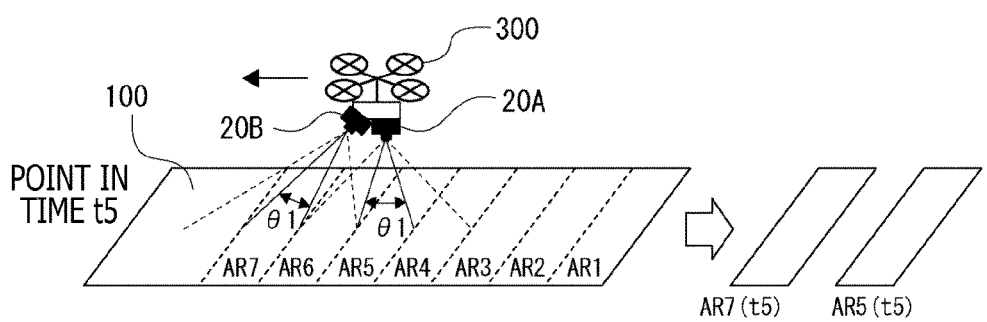
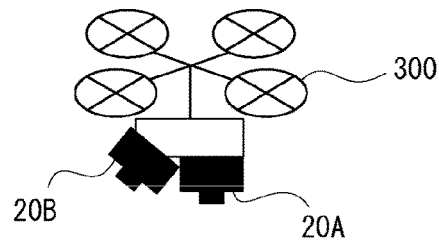

INFORMATION PROCESSING DEVICE, INFORMATION PROCESSING METHOD, AND PROGRAM

TECHNICAL FIELD

The present technique relates to an information processing device, an information processing method, and a program, and for example, to a technical field suitable for synthesis processing of a captured image for remote sensing.

BACKGROUND ART

Much effort has been made to perform remote sensing of a vegetation condition of plants by, for example, mounting an imaging device on a small flying object and moving over a farm field, while imaging the vegetation condition.

PTL 1 discloses a technique for imaging a farm field for remote sensing.

CITATION LIST

Patent Literature

[PTL 1]
Japanese Patent No. 5162890

SUMMARY

Technical Problem

For example, by imaging a farm field using an imaging device mounted on a flying object, with the flying object being moved over the farm field, captured images of vegetation in the farm field are obtained, the images covering a reasonably wide range. That is, images captured at different points in time and covering slightly different places are synthesized to obtain a synthesized image covering a wide range in the farm field. This is effective for sensing of a vegetation condition of different portions of the farm field.

Images captured by the imaging device mounted on the flying object overlap one another to some degree, and stitch processing is executed on the images, with matching between the images checked. Utilizing the fact that the images are captured by imaging the same position with parallaxes, the images are orthographically projected and converted, for example, into images as viewed from directly above.

However, the amount of information involved in the manner of using parallax images of plants to create orthographic images is small compared to the complexity of the plants, and thus, difficulty lies in achieving conversion into images of the plants as viewed from directly above.

As a result, the above-described method is useful for checking the atmosphere of the vegetation condition in the images, but involves many errors and instability in a case where measurement results and quantified into sensing data. The method is thus insufficient.

Thus, an object of the present technique is to allow acquisition of information such as images that has few errors and that is suitable, for example, for remote sensing.

Solution to Problem

An information processing device according to the present technique includes an extraction section extracting an image of a specific region in an acquired image including information regarding a specific wavelength region and a synthesis section synthesizing a plurality of images of the specific region extracted by the extraction section from respective acquired images acquired at different points in time to generate a synthetic image.

That is, information regarding the same information region is extracted from different pieces of imaging information obtained at respective points in time to obtain synthetic information.

In the above-described information processing device, the extraction section extracts images of the specific region in the acquired images as captured images captured by an imaging device.

That is, images of the same image region in each captured image are extracted from respective captured images captured at the different points in time, and the extracted images are synthesized.

In the above-described information processing device, the specific region may be an image region in which an angle of incidence of object light on an imaging element of the imaging device is in a specific incident-angle range.

In this case, images of the image region within the same incident-angle range are extracted from the respective captured images captured at the different points in time, and the extracted images are synthesized.

In the above-described information processing device, the extraction section may execute processing of extracting an image of a first specific region and an image of a second specific region from captured images, and the synthesis section may execute processing of synthesizing a plurality of images of the first specific region extracted by the extraction section from respective captured images captured at different points in time to generate a first synthetic image, and processing of synthesizing a plurality of images of the second specific region extracted by the extraction section from respective captured images captured at the different points in time to generate a second synthetic image.

In other words, a plurality of synthetic images is generated from the captured images captured at the different points in time. Each of the synthetic images is a collection of images of a specific positional range in each captured image, for example, an image region within the same incident-angle range.

In the above-described information processing device, the extraction section may extract an image of an image region in which the angle of incidence of the object light on the imaging element of the imaging device is less than or equal to a predetermined angle from a lens system optical axis as an image of the specific region.

In other words, an image of an image region of the center of the angle of view of each captured image (range in the center of a visual field where the incident angle is small) is extracted, and the resultant images are collected to generate a plurality of synthetic images.

In the above-described information processing device, the extraction section may extract, as an image of the specific region, an image of an image region in which the angle of incidence of the object light on the imaging element of the imaging device is more than or equal to a first angle and less than or equal to a second angle from the lens system optical axis.

In other words, the specific region is a region (range in which the incident angle is large) located eccentrically in a left direction or a right direction (or an up direction or a down direction) as viewed from the center of the angle of view of the image. The region is close to an edge portion of the angle of view. Images of such an image region are extracted and collected to generate plurality of synthetic images.

In the above-described information processing device, the synthesis section may arrange, in order of a point in time of imaging, a plurality of images of the specific region extracted by the extraction section and execute stitch processing on the images to generate a synthetic image.

By capturing images at different points in time, with the imaging device being moved, a plurality of captured images covering a wide range can be obtained. An image of the specific region is extracted from each of the captured images, the resultant images are arranged in a temporal order, and stitch processing is executed on the arranged images.

In the information processing device, the synthesis section may execute processing using positional information on an image resulting from the stitch processing.

For example, processing is executed in which the image resulting from stitching is superimposed on a map image utilizing positional information added to the captured images.

In the information processing device, the extraction section may execute processing of extracting images of the specific region from first captured images captured at different points in time by a first imaging device and processing of extracting images of the specific region from second captured images captured at different points in time by a second imaging device, and the synthesis section may execute processing of synthesizing the images of the specific region extracted from the first captured images captured at the different points in time to generate a first synthetic image and processing of synthesizing the images of the specific region extracted from the second captured images captured at the different points in time to generate a second synthetic image.

In other words, this aspect is directed to captured images captured by a plurality of imaging devices. Then, an image of the specific region is extracted from each of the captured images captured at the different points in time, and the resultant images are synthesized to generate a synthetic image.

In the above-described information processing device, the extraction section may extract, as images of the specific region, images of an image region in which the angle of incidence of the object light on the imaging element of the imaging device is less than or equal to a predetermined angle from the lens system optical axis, both from the first captured images and from the second captured images.

For the captured image captured by each imaging device, an image of an image region of the center of the angle of view in the captured image (range in the center of the visual field where the incident angle is small) is extracted, and the resultant images of the image region are collected to generate a plurality of synthetic images.

In the above-described information processing device, the extraction section may set the specific region according to the acquired image.

Determination of which region is to be cut out from the captured image as the specific region is performed according to the captured image.

In the above-described information processing device, the extraction section may determine a region in a specific image state for each of the captured images captured at the different points in time, and set the determined region as the specific region.

The specific region is variably set according to the image state (for example, brightness) of each portion of each captured image.

In the above-described information processing device, the extraction section may set the specific region according to selection information.

Which region of the captured image is set as the specific region is determined according to a selection operation by a user.

In the above-described information processing device, the extraction section may execute processing of extracting images of the specific region from the captured images captured at the different points in time by a line sensor-type imaging device.

In the line sensor-type imaging device, light receiving elements are arranged as one-dimensional lines, and thus, for the captured images, the incident angles of incidence on the lines are similar.

In the above-described information processing device, the specific region may be an image region in which the angle of incidence of the object light on the imaging element of the imaging device is less than or equal to the predetermined angle from the lens system optical axis, the synthesis section may synthesize a plurality of images of the specific region extracted by the extraction section from respective captured images captured at the different point in time to generate a synthetic image, and the information processing device may include a calculation section executing calculation of a vegetation condition of plants using the synthetic image.

That is, a synthetic image of images as viewed from substantially directly above is used as an image of the specific region to calculate the vegetation condition of the plants.

In the above-described information processing device, the specific region may be an image region in which the angle of incidence of the object light on the imaging element of the imaging device is more than or equal to a first angle and less than or equal to a second angle from the lens system optical axis, the synthesis section may synthesize a plurality of images of the specific region extracted by the extraction section from a plurality of captured images captured at the different point in time to generate a synthetic image, and the information processing device may include a calculation section calculating a vegetation index using the synthetic image.

That is, the vegetation index is calculated using a synthetic image of images of a region (range in which the incident angle is large) located eccentrically in a left direction or right direction (or an up direction or a down direction) as viewed from the center of the angle of view in the image as an image of the specific region.

An information processing method executed by an information processing device according to the present technique includes an extraction procedure of extracting an image of a specific region in an acquired image including information regarding a specific wavelength region and a synthesis procedure of synthesizing a plurality of images of the specific region extracted, during the extraction procedure, from respective acquired images acquired at different points in time to generate a synthetic image.

Accordingly, images of the same image region in each captured image is extracted from captured images captured at different points in time, and the images of the same image region are synthesized.

A program according to the present technique is a program for causing a computer device to execute processing corresponding to each of the above-described procedures.

Accordingly, the computer device can be used to easily implement and provide the above-described information processing device.

Advantageous Effect of Invention

According to the present technique, information (image information and the like) can be obtained that has few errors and that is suitable, for example, for quantizing imaging information into sensing data.

Note that effect described herein is not necessarily limited but that any of the effects described in the present disclosure may be produced.

BRIEF DESCRIPTION OF DRAWINGS

FIG. 7 is a descriptive diagram of synthetic images according to an embodiment and a comparative example.

FIG. 9 is a descriptive diagram of synthetic images according to the first embodiment.

FIG. 13 is a descriptive diagram of specular reflection from a leaf considered in the third embodiment.

FIG. 15 is a descriptive diagram of specular reflection from a leaf considered in the third embodiment.

FIG. 17 is a descriptive diagram of imaging and extraction of a specific region in a fourth embodiment.

DESCRIPTION OF EMBODIMENTS

Embodiments will be described in the following order.
<1. Description of Remote Sensing of Vegetation Condition>
<2. Device Configuration>
<3. First Embodiment>
<4. Second Embodiment>
<5. Third Embodiment>
<6. Fourth Embodiment>
<7. Fifth Embodiment>
<8. Conclusion and Modified Examples>

1. DESCRIPTION OF REMOTE SENSING OF VEGETATION CONDITION

In embodiments, an information processing device that synthesizes captured images will be described taking as an example a case where a vegetation condition of a farm field is sensed. Before the information processing device is described, remote sensing using a flying object will be described.

Figure 1:
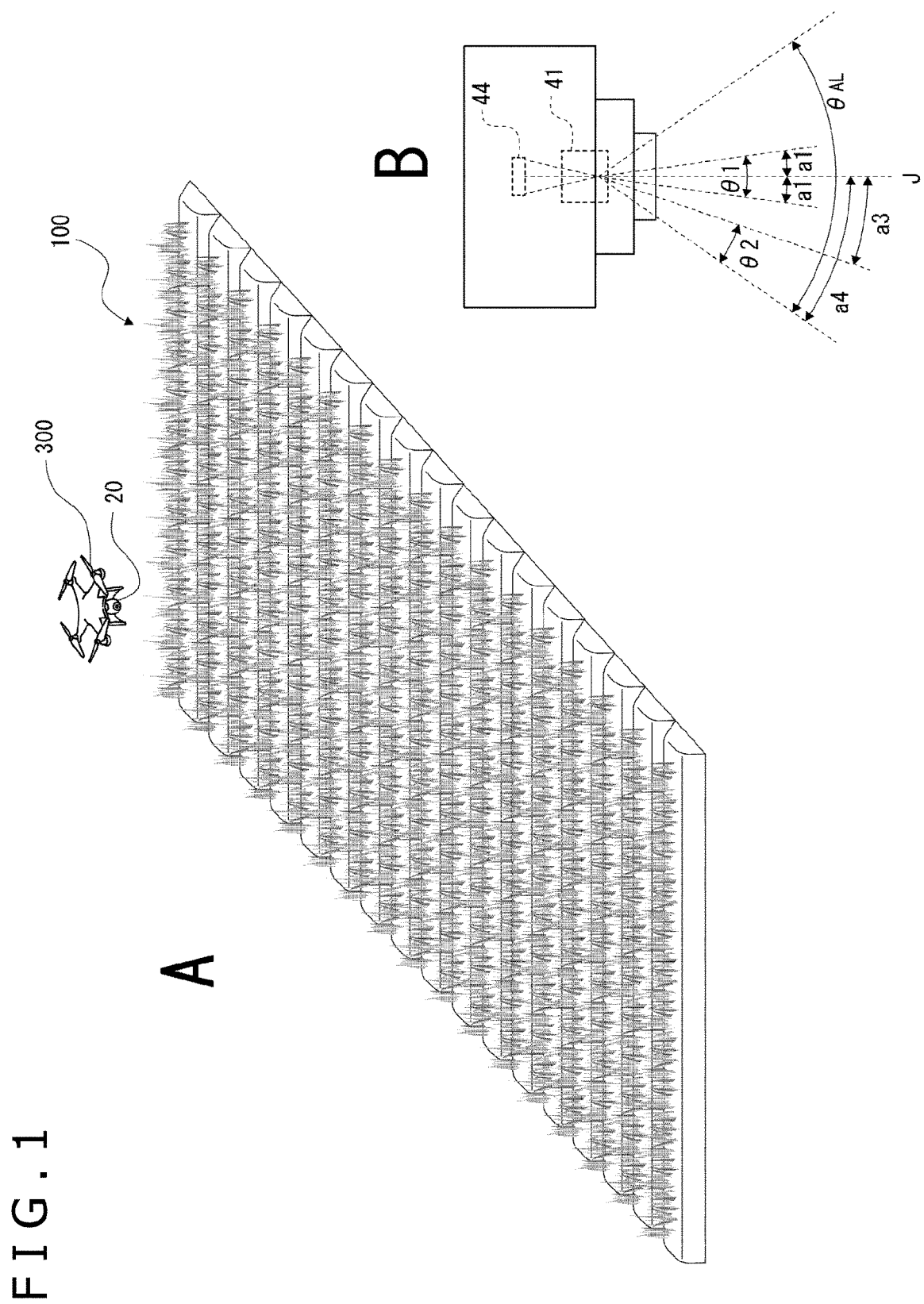
FIG. 1 is a descriptive diagram of remote sensing of a vegetation condition performed according to an embodiment.

FIG. 1A illustrates a farm field 100. Much effort has recently been made to remotely sense the vegetation condition using an imaging device (camera unit 20) mounted on a flying object 300 as illustrated in FIG. 1A.

The small flying object 300 in FIG. 1A can be moved over the farm field 100, for example, by wireless control of an operator or wireless automatic control.

The flying object 300 includes a camera unit 20 set, for example, to image a scene below. When the flying object 300 moves over the farm field 100 along a predetermined route, the camera unit 20 can obtain images of the range of an imaging visual field at different points in time by, for example, periodically capture still images or capture moving images.

FIG. 1B illustrates the imaging visual field of the camera unit 20. For example, FIG. 1B illustrates an incident range θAL (angle of view) of object light incident on an image sensor 44 inside the camera unit 20. The incident range θAL obviously varies depending on a lens system 41 in the camera unit 20 including a zoom lens mechanism not illustrated. However, the incident range θAL is normally fixed to a certain angle of view during a period when the flying object 300 moves over the farm field 100, while capturing images (period when at least imaging is performed to obtain images used to generate synthetic images).

Various configurations are possible for an imaging device constituting the camera unit 20.

For example, an image file (captured images captured at a certain point in time) obtained by imaging with the camera unit 20 may include spectral measurement images. That is, the camera unit 20 is a multi-spectrum camera, and captured images include measurement images including information regarding two or more specific wavelength regions.

Note that, as the camera unit 20, a camera may also be used that captures visible light images in red (R), green (G), and blue (B).

Additionally, as the camera unit 20, a camera may also be used that obtains captured images of an infrared (RED) region and a near infrared (NIR) region and allows NDVI (Normalized Difference Vegetation Index) images to be obtained.

Additionally, images captured and obtained by the camera unit 20 include tag information added to the images. The tag information includes imaging date and time information, positional information (latitude/longitude information) as GPS (Global Positioning System) data, imaging device information (individual identification information, model information, and the like regarding the camera), and information regarding each image data (information such as image size, wavelength, and imaging parameters).

In the present embodiment, processing of captured image data from the camera unit 20 involves aggregation of data for each of different image regions with respective incident angles to isolate the density of vegetation and the activity of the vegetation, allowing more detailed information to be acquired.

For example, object light incident within the incident range θAL is photoelectrically converted into single image data by the image sensor 44. In the image data, a specific region refers to an image region of object light incident within a specific incident-angle range θ1, θ2, or the like.

In the present embodiment, processing is executed in which images of the specific region are collected from image data obtained at different points in time and synthesized.

A synthetic image obtained by collecting and synthesizing images of the specific region is used for various analyses and observations related to vegetation. For example, it is assumed that a calculation device not illustrated is used to execute processing of determining vegetation indexes using the synthetic image.

The indexes used to measure environmental stress include:
PRI (photochemical reflectance index)
magnitude of chlorophyll fluorescence
chlorophyll fluorescence index, and
state transition reflectance.

The PRI is an indexed spectral reflectance varying in response to deepoxidation of a xanthophyll cycle. The xanthophyll cycle is a mechanism that releases, as heat, excessive light energy that is beyond the power of photosynthesis, as seen in blockage of pores responsive to intense light or water stress.

Here, the PRI is calculated as follows:

$$PRI=(R570-R531)/(R570+R531)$$

Note that "R570" is a reflected light intensity at a wavelength of 570 nm and that "R531" is a reflected light intensity at a wavelength of 531 nm.

The magnitude of chlorophyll fluorescence may involve solar-induced chlorophyll fluorescence (SIF) or chlorophyll fluorescence induced using a laser or a LED instead of sunlight.

The chlorophyll fluorescence index is obtained by separately measuring chlorophyll fluorescence at several wavelengths and represented as a ratio between chlorophyll fluorescence at a wavelength of 685 nm and chlorophyll fluorescence at a wavelength of 735 nm.

Stress can also be detected using chlorophyll fluorescence. The chlorophyll fluorescence is fluorescence emitted from a plant as a result of photosynthesis of the plant. In this phenomenon, unless energy is removed, within a given time, from the center of reaction induced by electrons under light, in higher plants, energy is released as fluorescence with a wavelength of approximately 680 to 770 nm.

The released energy accounts for 0.5% to 3% of the energy of input light. The amount of released energy fluctuates according to the state of photosynthesis of the plant and increases consistently with the amount of excessive light energy that is beyond the power of photosynthesis as seen in blockage of pores caused by intense light or water stress.

The camera unit 20 is used to capture images, and synthetic images are generated using a technique of the present embodiment described below. Then, the above-described indexes are generated on the basis of the synthetic images to enable accurate analysis and observation of the vegetation.

2. DEVICE CONFIGURATION

Various devices functioning as the information processing device 10 of an embodiment will be described.

Figure 2:
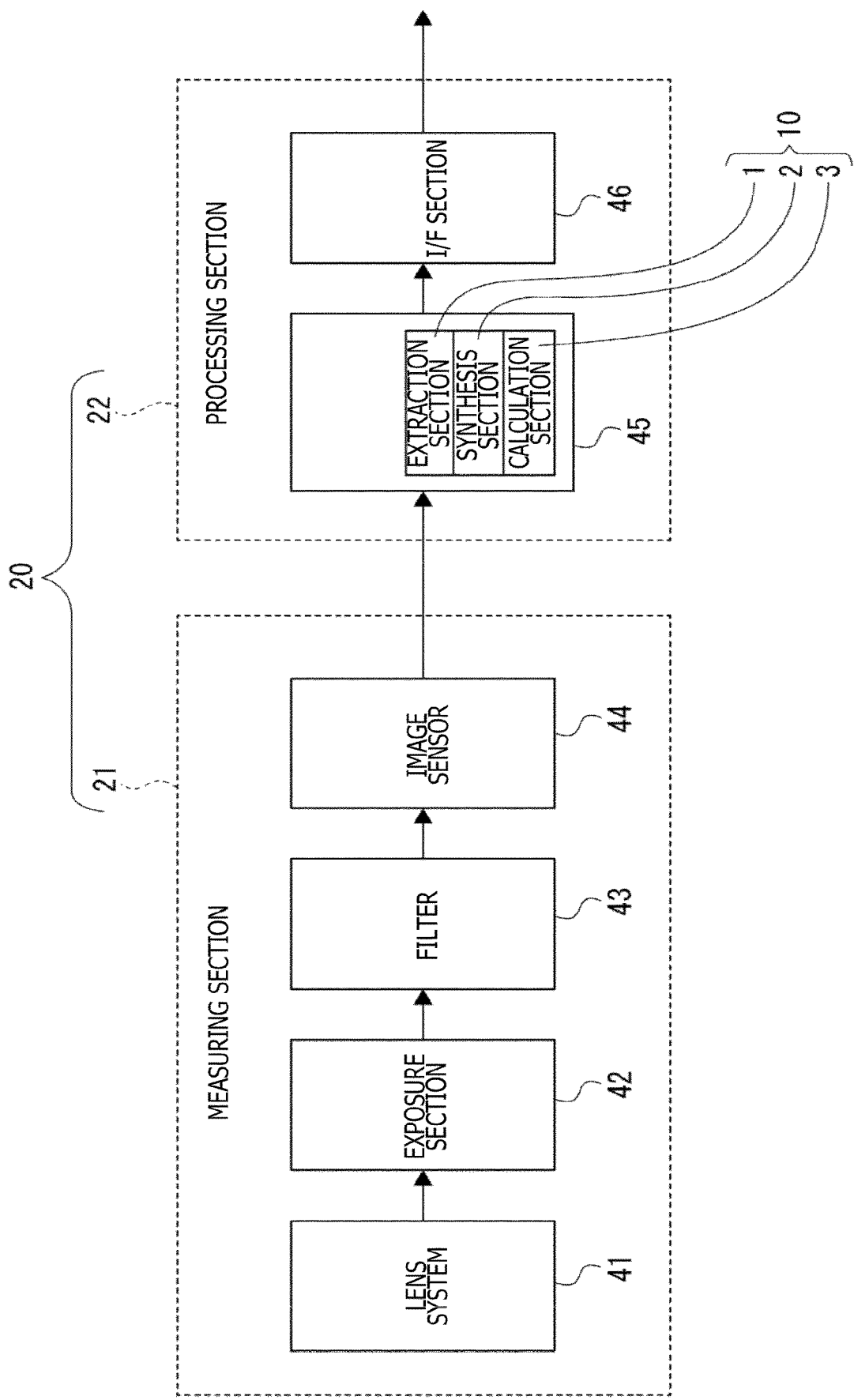
FIG. 2 is a block diagram of a camera unit of an embodiment.

FIG. 2 illustrates a configuration example of the camera unit 20. In the camera unit 20, a signal processing section 45 can be caused to function as the information processing device 10 of the present embodiment.

As illustrated in FIG. 2, the camera unit 20 includes a measuring section 21 including the lens system 41, an exposure section 42, a filter 43, and the image sensor 44, and a processing section 22 including the signal processing section 45 and an I/F section 46.

In the camera unit 20, light (reflected light) from an object such as an object to be measured is incident on the image sensor 44 via the lens system 41 and the filter 43.

The lens system 41 is an incident optical system including various lenses such as an incident end lens, a zoom lens, a focus lens, and a condensing lens.

The filter 43 is a filter intended to take out, for the object to be measured, a wavelength to be measured. The filter 43 includes a combination of, for example, a color filter constructed on the image sensor and an IR cut filter disposed in front of the color filter, and a part of the filter may optionally be placed in front of the exposure section 42 (incidence side) or the lens system 41.

The exposure section 42 adjusts an opening amount or the like using the optical system such as the lens system 41 or an iris (diaphragm) to control exposure such that, in the image sensor 44, sensing is performed with signal charge being within a dynamic range instead of being saturated.

The image sensor 44 includes sensing elements including, on a sensor surface, a plurality of pixels two-dimensionally arranged in a repetition pattern.

The image sensor 44 uses the sensing elements to detect light having passed through the filter 43 and thus outputs, to the signal processing section 45, a measurement signal (image data) corresponding to the amount of light.

The signal processing section 45 executes various types of signal processing on image data output from the image sensor 44 and outputs the resultant data to the interface section 46.

The interface section 46 outputs, to external equipment, the image data processed by the signal processing section 45 and other information.

Here, in a case where the camera unit 20 including the signal processing section 45 functions as the information processing device 10 of the present embodiment, the signal processing section 45 is provided with an extraction section 1, a synthesis section 2, and a calculation section 3 as illustrated.

The extraction section 1 executes, on a captured image obtained by the image sensor 44, for example, processing of extracting an image of a specific region corresponding to a specific positional range in the image.

The synthesis section 2 executes processing of synthesizing a plurality of images of the specific region extracted from respective captured images captured at different points in time to generate a synthetic image.

The calculation section 3 executes various calculations using the synthetic image generated by the synthesis section 2. For example, the calculation section 3 calculates values indicative of the vegetation condition, such as the density of the vegetation and the variance of plant species and calculates the vegetation indexes such as the PRI, the magnitude of chlorophyll fluorescence, the chlorophyll fluorescence index, and the state transition reflectance described above.

Specific examples of processing will be described below, and by being provided with the functions of at least the extraction section 1 and the synthesis section 2 in hardware or software, the signal processing section 45 (or the camera unit 20 including the signal processing section 45) corresponds to the information processing device recited in claims. In that case, the interface section 46 can output, to the external equipment, the synthetic image generated by the signal processing section 45.

Additionally, by being provided with the functions of the calculation section 3, the signal processing section 45 can further output calculated values for the vegetation condition, the vegetation indexes, and the like to external equipment via the interface section 46.

Note that depending on a system configuration, the camera unit 20 may not include the functions of the extraction section 1 or the synthesis section 2. In that case, the interface section 46 transmits, to the external equipment, captured images captured by the camera unit 20 at different points in time.

In a case where the external equipment is the information processing device 10 including the extraction section 1 and the synthesis section 2, the external equipment generates a synthetic image.

Figure 3:
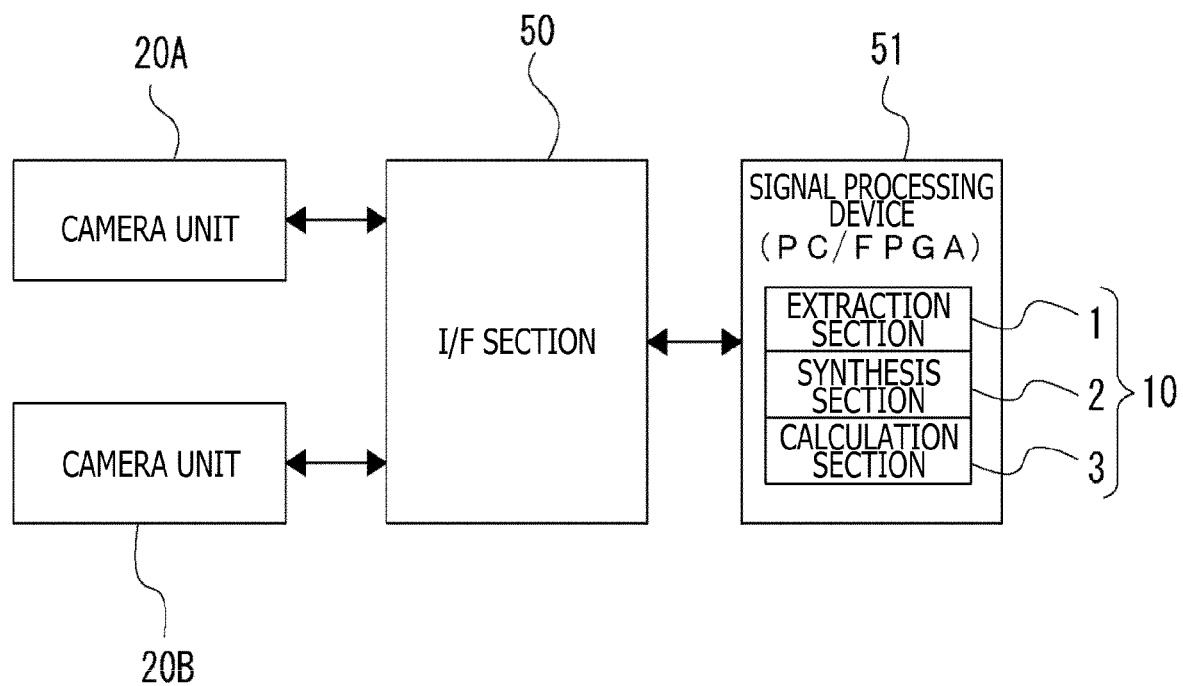
FIG. 3 is a block diagram of a sensing system of an embodiment.

An example of such a system configuration is illustrated in FIG. 3.

In this example, two camera units 20A and 20B, an interface section 50, and a signal processing device 51 are illustrated.

Each of the camera units 20A and 20B is configured as illustrated in FIG. 2. However, the signal processing section 45 need not have the functions of the extraction section 1 and the synthesis section 2.

For example, each of the camera units 20A and 20B outputs, to the interface section 50, captured images captured at different points in time.

The interface section 50 transmits, to the signal processing device 51, captured images captured by the camera units 20A and 20B captured at different points in time.

The signal processing device 51 is implemented, for example, as a PC (personal computer) or an FPGA (field-programmable gate array).

By being provided with the functions of the extraction section 1 and the synthesis section 2, the signal processing device 51 can generate a synthetic image on the basis of captured images captured by the camera unit 20A and can generate a synthetic image on the basis of captured images captured by the camera unit 20B.

Furthermore, by being provided with the functions of the calculation section 3, the signal processing device 51 can determine calculated values for the vegetation condition, the vegetation indexes, and the like.

Note that, although FIG. 3 illustrates the two camera units 20A and 20B, a system configuration is also possible that includes three or more camera units 20.

Additionally, for example, a system configuration is possible in which one camera unit 20 and the signal processing device 51 are connected together.

Furthermore, in these cases, it is also assumed that the signal processing section 45 of the camera unit 20 (20A and 20B) includes the functions of the extraction section 1 and the synthesis section 2 and that the signal processing device 51 does not include the functions of the extraction section 1 and the synthesis section 2.

Figure 4:
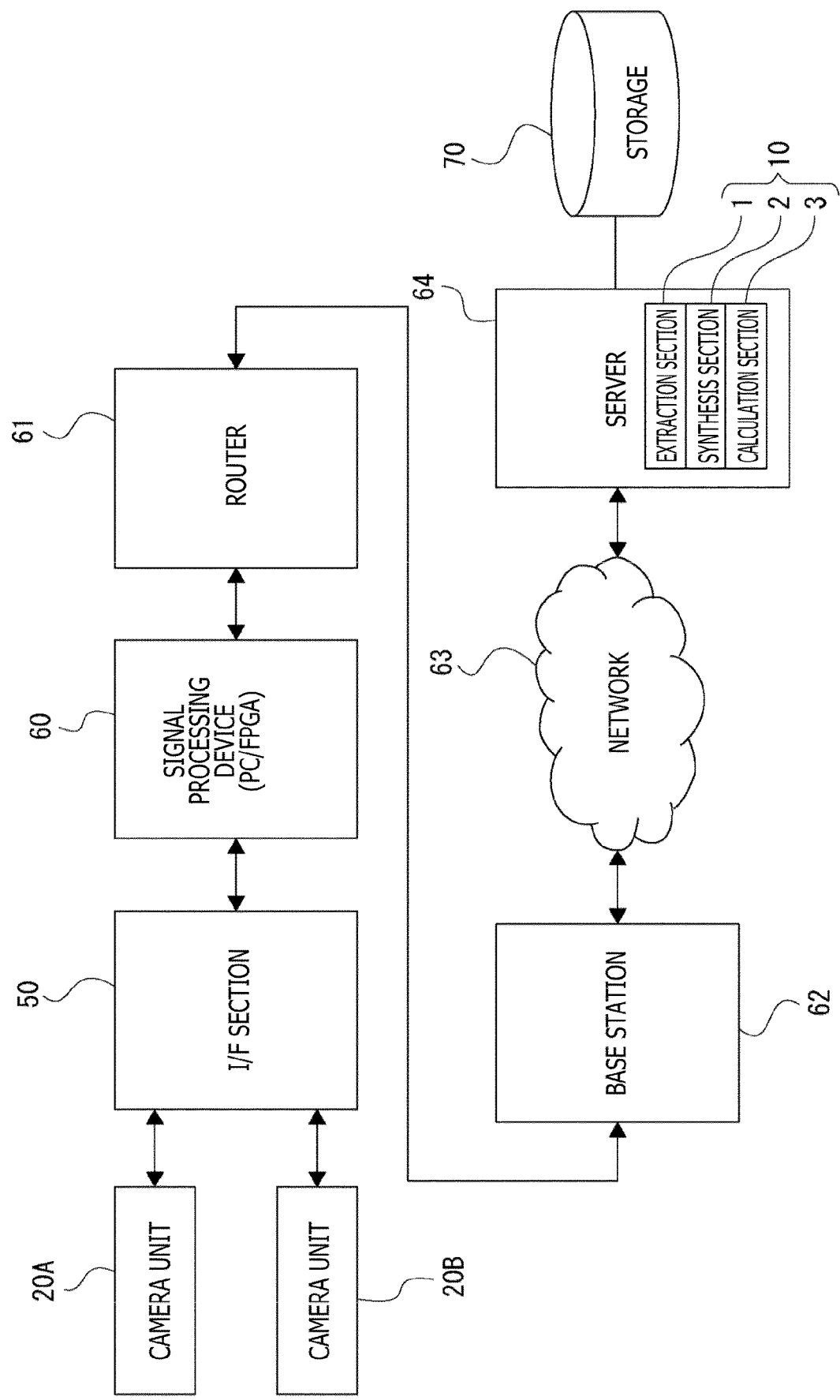
FIG. 4 is a block diagram of another sensing system of an embodiment.

FIG. 4 illustrates yet another system configuration. In this example, a server 64 at a remote location functions as the information processing device 10 of the present embodiment.

FIG. 4 illustrates the two camera units 20A and 20B, the interface section 50, a signal processing device 60, a router 61, a base station 62, a network 63, a server 64, and a storage 70.

The signal processing device 60 is a PC or an FPGA as in the case of FIG. 3. However, in this case, the signal processing device 60 need not include the functions of the extraction section 1 and the synthesis section 2.

The router 61 is, for example, a mobile router, and can be connected via the base station 62 to the network 63 such as the Internet.

The signal processing device 60 uses the router 61 to transmit, to the server 64, captured images acquired from the camera units 20A and 20B. Thus, the captured images are loaded into the server 64 via the base station 62 and the network 63.

The server 64 includes the functions of the extraction section 1 and the synthesis section 2. Accordingly, the server 64 can execute image extraction processing and synthesis processing on the received captured images to generate a synthetic image.

The storage 70 is used to save, for the server 64, the captured images transmitted from the signal processing device 60 and generated synthetic images.

Additionally, the server 64 may include the functions of the calculation section 3. This allows calculated values for the vegetation condition, the vegetation indexes, and the like to be determined using the synthetic images.

The PC and the like serving as the signal processing device 60 can access the server 64 and browse and download the synthetic images.

Additionally, in a case where the server 64 includes the calculation section 3, the signal processing device 60 can access the server 64 and browse and acquire the calculated values for the vegetation condition, the vegetation indexes, and the like.

As illustrated in FIG. 2, FIG. 3, and FIG. 4, it is assumed that the camera unit 20, the signal processing device 51 such as a PC or an FPGA, or the server 64 corresponds to the information processing device recited in claims.

The signal processing section 45 in the camera unit 20 may include, for example, a microcomputer and provide the functions of the extraction section 1, the synthesis section 2, and the calculation section 3 in the form of software.

Figure 5:
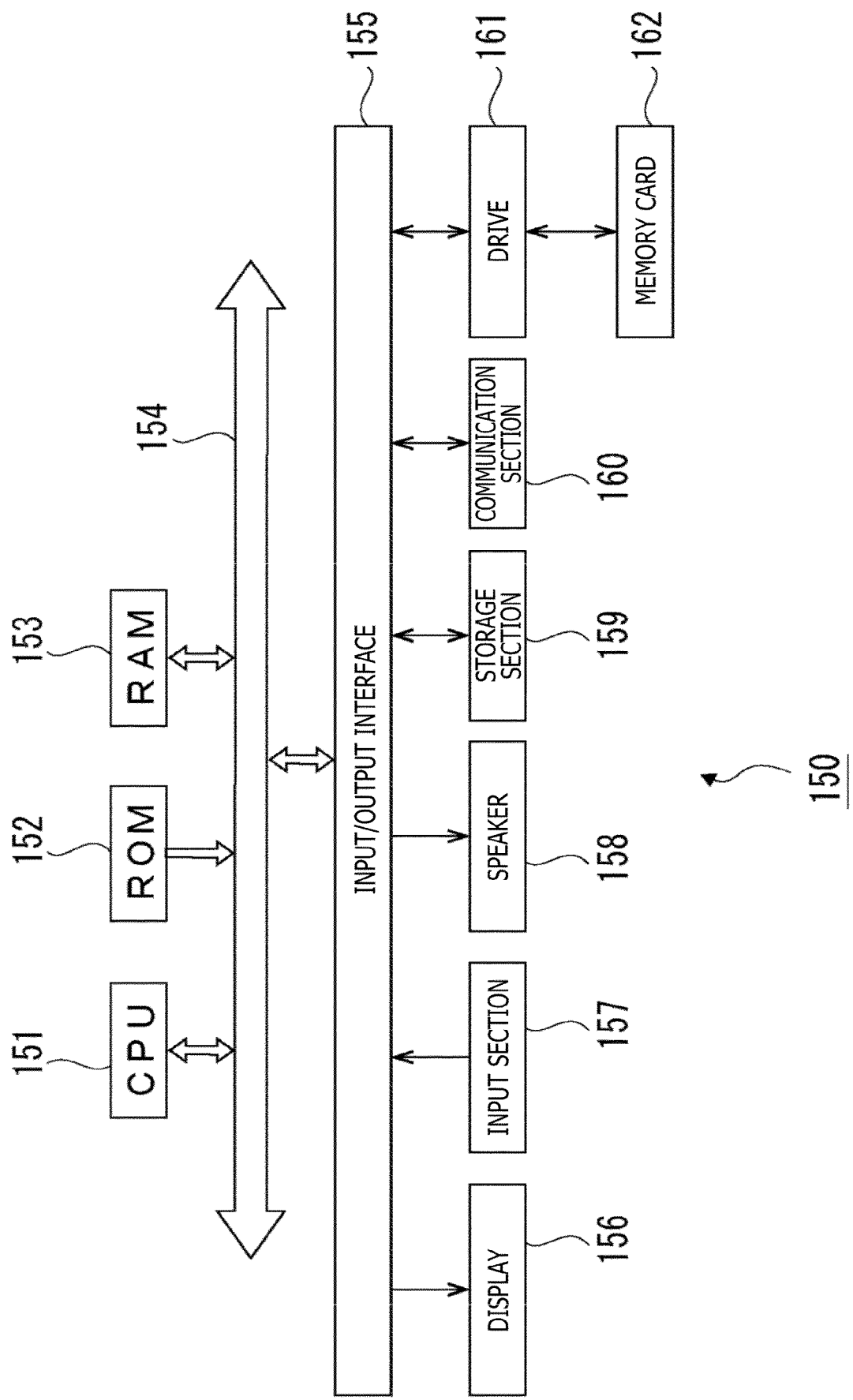
FIG. 5 is a block diagram of a computer device implementing an information processing device of an embodiment.

The signal processing device 51 and the server 64 are implemented by a computer device 150 including, for example, a hardware configuration as illustrated in FIG. 5.

As illustrated in FIG. 5, the computer device 150 includes a CPU (Central Processing Unit) 151, a ROM (Read Only Memory) 152, and a RAM (Random Access Memory) 153.

The CPU 151 executes various types of processing in accordance with programs stored in the ROM 152 or programs loaded from the storage section 159 into the RAM 153. The RAM 153 stores appropriate data and the like required for the CPU 151 to execute various types of processing.

The CPU 151, the ROM 152, and the RAM 153 are connected together via a bus 154. An input/output interface 155 is also connected to the bus 154.

The input/output interface 155 can connect to a display 156 consisting of a liquid crystal panel, an organic EL (Electroluminescence) panel, or the like, an input section 157 consisting of a keyboard, mouse, and the like, a speaker 158, a storage section 159 constituted of a HDD (Hard Disk Drive) or the like, a communication section 160, and the like.

The display 156 may be provided integrally with or separately from the computer device 150. For example, captured images or synthetic images are displayed and evaluation indexes are displayed.

The input section 157 means an input device used by a user using the computer device 150.

The communication section 160 executes communication processing via the network 63 including the Internet and communicates with equipment in peripheral sections.

Additionally, the drive 161 is connected to and the memory card 162 is installed in the input/output interface 155, as needed. A computer program read from the memory card 162 is installed in the storage section 159 or data processed by the CPU 151 is stored in the memory card 162, as needed. Obviously, the drive 161 may be a recording and reproducing drive for a removable storage medium such as a magnetic disk, an optical disk, or a photomagnetic disk.

Such a hardware configuration can execute processing of the information processing device 10 of the embodiment, that is, processing of the extraction section 1 and the synthesis section 2 or processing of the calculation section 3. That is, such processing can be implemented by software initiated by the CPU 151. A program constituting the software is downloaded from the network or read from the removable storage medium and installed in the computer device 150 in FIG. 5. Alternatively, the program may be pre-stored in the HDD or the like used as the storage section 159. Then, the CPU 151 initiates the program to accomplish the functions of the above-described sections.

Note that each of the signal processing device 51 and the server 64 according to the embodiment is not limited to the configuration of the single computer device (information processing device) 150 with the hardware configuration as illustrated in FIG. 5 but that a plurality of computer devices may be configured into a system. The plurality of computer devices may be configured into a system using a LAN or the like or arranged at remote locations on the basis of a VPN (Virtual Private Network) or the like utilizing the Internet or the like. The plurality of computer devices may include computer devices that are available through cloud computing service.

Additionally, the computer device 150 in FIG. 5 can be implemented as a desktop or notebook personal computer or a portable terminal such as a tablet terminal or a smartphone. Furthermore, the functions of the information processing device 10 of the present embodiment can also be provided in electronic equipment such as a measuring device, a television device, a monitor device, an imaging device, or a facility managing device which includes the functions of the computer device 150.

3. FIRST EMBODIMENT

Image processing as a first embodiment will be described below. Before operations of the embodiment is described, an image synthesizing technique easily assumed for remote sensing of the farm field 100 will be described as a comparative example.

FIG. 6A illustrates that the flying object 300 is flying over the farm field 100, with the camera unit 20 imaging the farm field 100.

FIG. 6A illustrates areas AR1, AR2, . . . AR7 for the farm field 100. However, the farm field 100 is divided into the areas for convenience of description, and the farm field 100 need not actually be divided into the areas.

FIG. 6A illustrates the areas AR1 to AR5 are included in the range of the visual field that can be imaged by the camera unit 20 at a certain point in time t10.

To cover the entire farm field 100, imaging is performed with the flying object 300 being moved in the direction of an arrow in the figure.

At the next point in time t11, the range of the areas AR2 to AR6 is imaged by the camera unit 20 as illustrated in FIG. 6B.

Furthermore, at the next point in time t12, the range of the areas AR3 to AR7 is imaged by the camera unit 20 as illustrated in FIG. 6C.

The images captured at the points in time t10, t11, and t12 by the camera unit 20 are designated as images G(t10), G(t11), and G(t12).

The images captured at the different points in time are only required to synthesize in order to obtain an image for observation and analysis of the vegetation over a wide range in the farm field 100.

The images G (G(t10), G(t11), G(t12), . . . ) captured by the camera unit 20 being moved by the flying object 300 are set to overlap one another by approximately 90%. Then, stitch processing is executed, with matching between the images checked as illustrated in FIG. 6D.

Utilizing the fact that the images are captured by imaging the same position with parallaxes, the images are orthographically projected and converted, for example, into images as viewed from directly above as illustrated in FIG. 6E. The images may be RGB visible-light images or NDVI images formed from RED and NIR images.

However, the amount of information involved in the manner of creating orthographic images using parallax images of plants is small compared to the complexity of the plants, and thus, difficulty lies in achieving conversion into images of the plants as viewed from directly above. As a result, this method is useful for checking the atmosphere of the vegetation condition in the images, but involves many errors and instability in a case where measurement results are quantified into sensing data. The method is thus insufficient.

FIG. 7C schematically illustrates the state of a generated synthetic image, the image including many unstable errors.

In contrast, in the present embodiment, an image of a specific region corresponding to a specific positional range in a captured image is extracted from each of the captured images G captured at the different points in time, and a plurality of extracted images of the specific region is synthesized to generate a synthetic image. Thus, a synthetic image with few errors is obtained as illustrated in FIG. 7A and FIG. 7B.

In this case, the specific region is defined as an image region with a small incident angle (corresponding to an area substantially directly below: first incident-angle range) and an image region with a large incident angle (corresponding to an area on a screen in a traveling direction: second incident-angle range). Image data for the respective regions are stitched into a first incident-angle image in FIG. 7A and a second incident-angle image in FIG. 7B.

A specific example of processing of the present embodiment will be described in which images captured for vegetation inspection are separated into images of different incident-angle ranges, and images of each incident-angle range are formed into a stitch image as described above.

Figure 6:
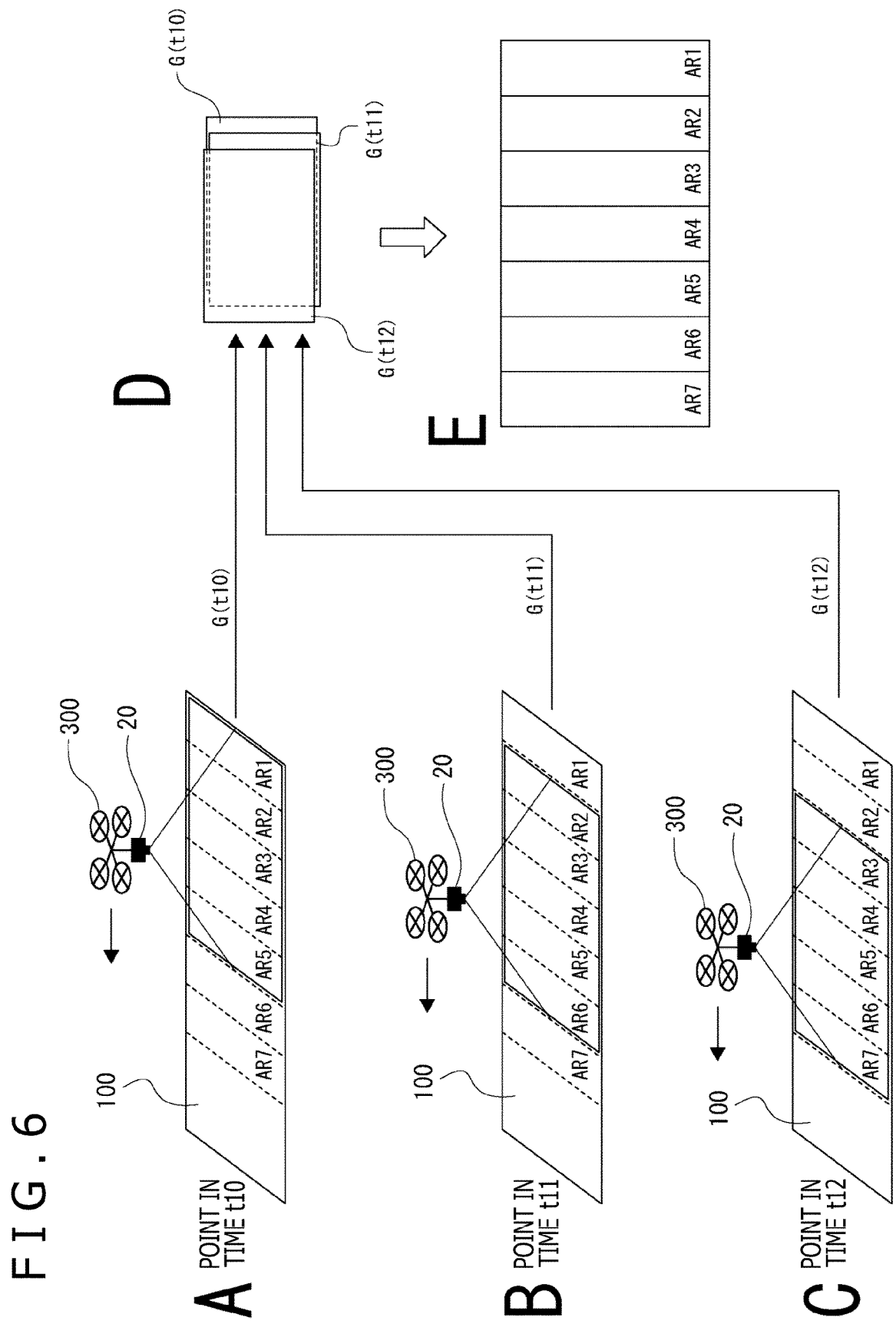
FIG. 6 is a descriptive diagram of image synthesis as a comparative example.

FIGS. 8A to 8E illustrate the manner of imaging at the different points in time similarly to FIG. 6 for the comparative example.

In FIG. 8A, the flying object 300 is flying over the farm field 100, with the camera unit 20 imaging the farm field 100. It is assumed that, at a point in time t1, an image of the areas AR1, AR2, and AR3 of the farm field 100 is captured.

At a point in time t2 in FIG. 8B, an image of the areas AR1, AR2, AR3, and AR4 is captured.

At a point in time t3 in FIG. 8C, an image of the areas AR1 to AR5 is captured.

At a point in time t4 in FIG. 8D, an image of the areas AR2 to AR6 is captured.

At a point in time t5 in FIG. 8E, an image of the areas AR3 to AR7 is captured.

Figure 8:
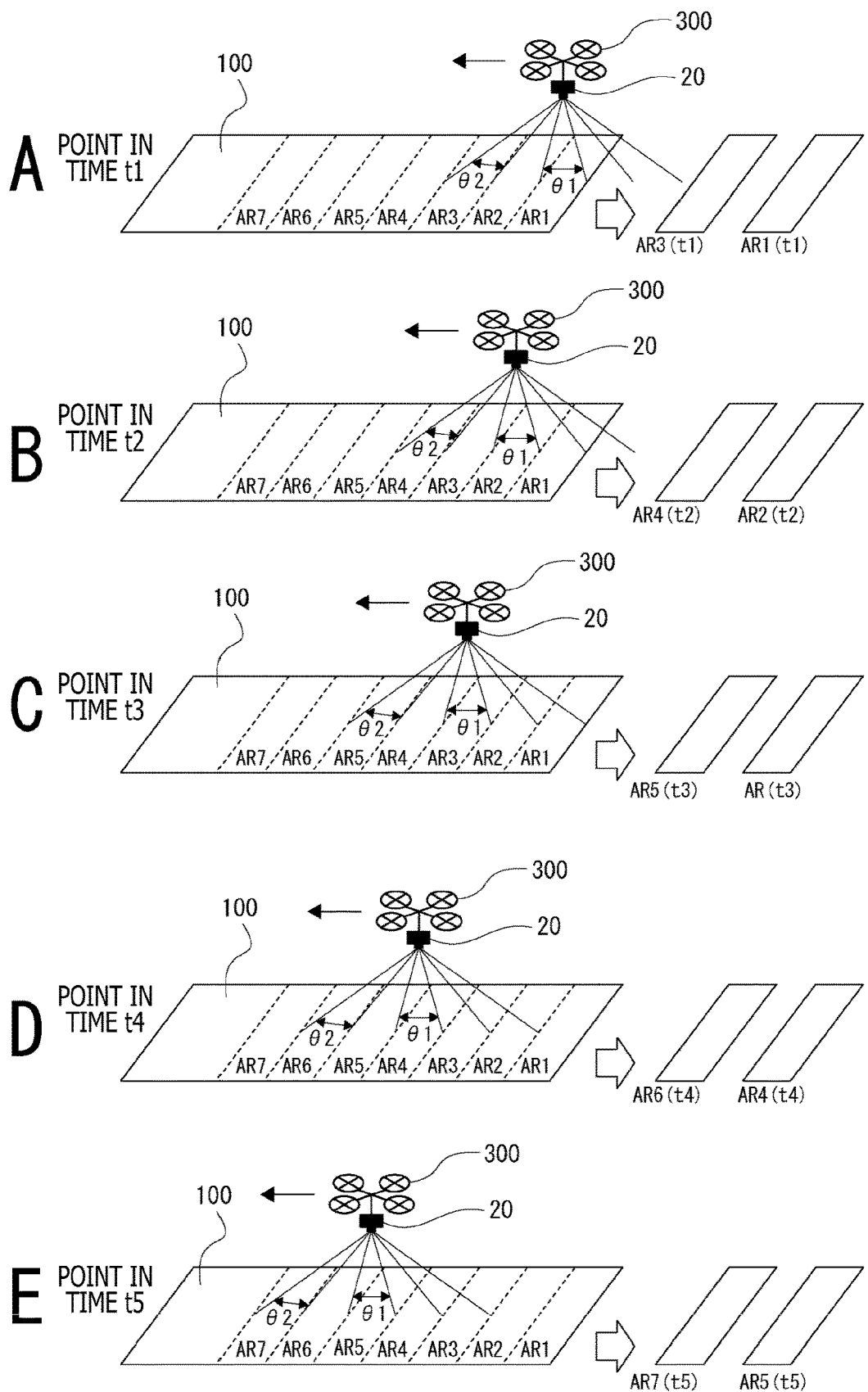
FIG. 8 is a descriptive diagram of imaging and extraction of a specific region according to a first embodiment.

Here, for the camera unit 20, the incident-angle range θAL (angle of view) of object light is determined according to the state of the lens system 41 as described above and illustrated in FIG. 1B. The first incident-angle range θ1 and the second incident-angle range θ2 illustrated in FIG. 8 are assumed to be included within the incident range.

By way of example, the first incident-angle range θ1 is an incident-angle range corresponding to an area substantially directly below.

For example, as illustrated in FIG. 1B, the first incident-angle range θ1 is a range in which the incident angle of the object light to the image sensor 44, which is an imaging element, is in the range of ±angle a1 from a lens system optical axis J. That is, this region involves the smallest incident angle.

Additionally, the second incident-angle range θ2 is a region (region with a large incident angle) located eccentrically at an end portion of the angle of view as viewed from the center of the angle of view. For example, in FIG. 1B, the angle of incidence of the object light on the image sensor 44 is more than or equal to a first angle a3 and less than or equal to a second angle a4 from the lens system optical axis J.

For example, specific regions are set as such incident-angle ranges θ1 and θ2, and an image of the specific regions is extracted from each of the captured images captured at the different points in time.

From the captured image captured at the point in time t1 in FIG. 8A, images representing the areas AR1 and AR3 are extracted as images of the incident-angle ranges θ1 and θ2. Using reference signs for areas and points in time, the images of the specific regions are designated as images AR1(t1) and AR3(t1).

From the captured image captured at the point in time t2 in FIG. 8B, images AR2(t2) and AR4(t2) respectively representing the areas AR2 and AR4 are extracted as images of the incident-angle ranges θ1 and θ2.

From the captured image captured at the point in time t3 in FIG. 8C, images AR3(t3) and AR5(t3) respectively representing the areas AR3 and AR5 are extracted as images of the incident-angle ranges θ1 and θ2.

From the captured image captured at the point in time t4 in FIG. 8D, images AR4(t4) and AR6(t4) respectively representing the areas AR4 and AR6 are extracted as images of the incident-angle ranges θ1 and θ2.

From the captured image captured at the point in time t5 in FIG. 8E, images AR5(t5) and AR7(t5) respectively representing the areas AR5 and AR7 are extracted as images of the incident-angle ranges θ1 and θ2.

Images of the specific regions are similarly extracted from the captured images captured at the subsequent points in time.

The thus extracted images of the specific regions are collected and synthesized.

FIG. 9A illustrates an image obtained by collecting and synthesizing the images AR1(t1) to AR7(t7) of the incident-angle range θ1 obtained at the different points in time. Note that images AR6(t6) and AR7(t7) are extracted from captured images captured at points in time t6 and t7 later than the point in time t5 in FIG. 8E.

The images AR1(t1) to AR7(t7) all represent the area substantially directly below at the respective points in time. As such a first incident-angle image, the image as illustrated in FIG. 7A is obtained.

Additionally, FIG. 9B illustrates an image obtained by collecting and synthesizing images AR1(t−1) to AR7(t5) of the incident-angle range θ2 obtained at the different points in time. Note that images AR2(t0) and AR1(t−1) are extracted from captured images captured at points in time t0 and t−1 earlier than the point in time t1 in FIG. 8A.

The images AR1(t−1) to AR7(t5) all represent an area obliquely below in the traveling direction of the flying object 300 at the respective points in time. As such a second incident-angle image, the image as illustrated in FIG. 7B is obtained.

As each of the synthetic images in FIG. 7A and FIG. 7B, a stable and accurate image is obtained due to the lack of unreasonable image conversion.

Additionally, the synthetic image in FIG. 7A is constituted of an image as viewed from directly above and thus represents soil portions, allowing the density of the plants to be observed.

Additionally, the synthetic image in FIG. 7B is a collection of images as obliquely viewed, allowing only the condition and activity of the plants to be observed.

Figure 10:
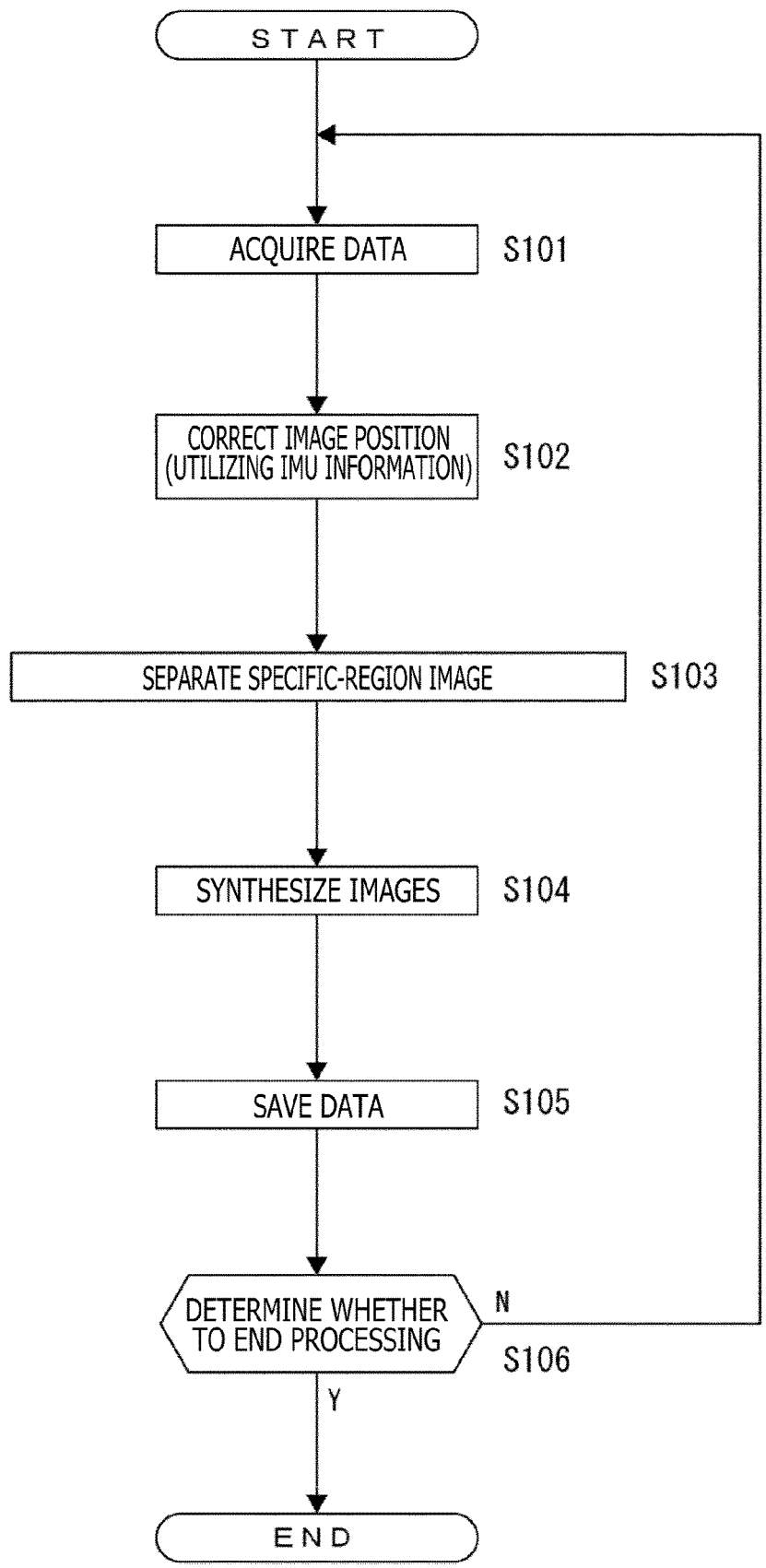
FIG. 10 is a flowchart of image processing according to the first embodiment.
Figure 11:
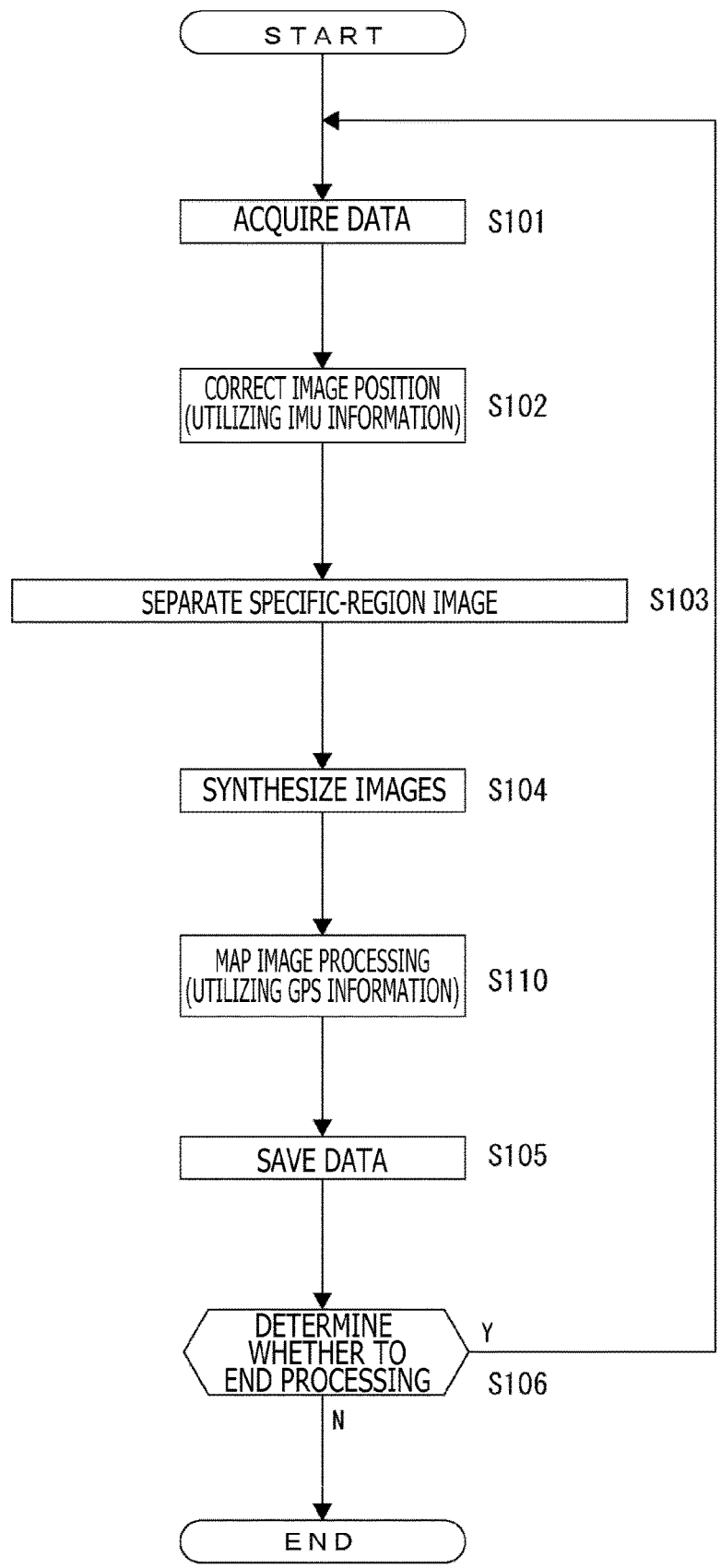
FIG. 11 is a flowchart of image processing in a second embodiment.
Figure 12:
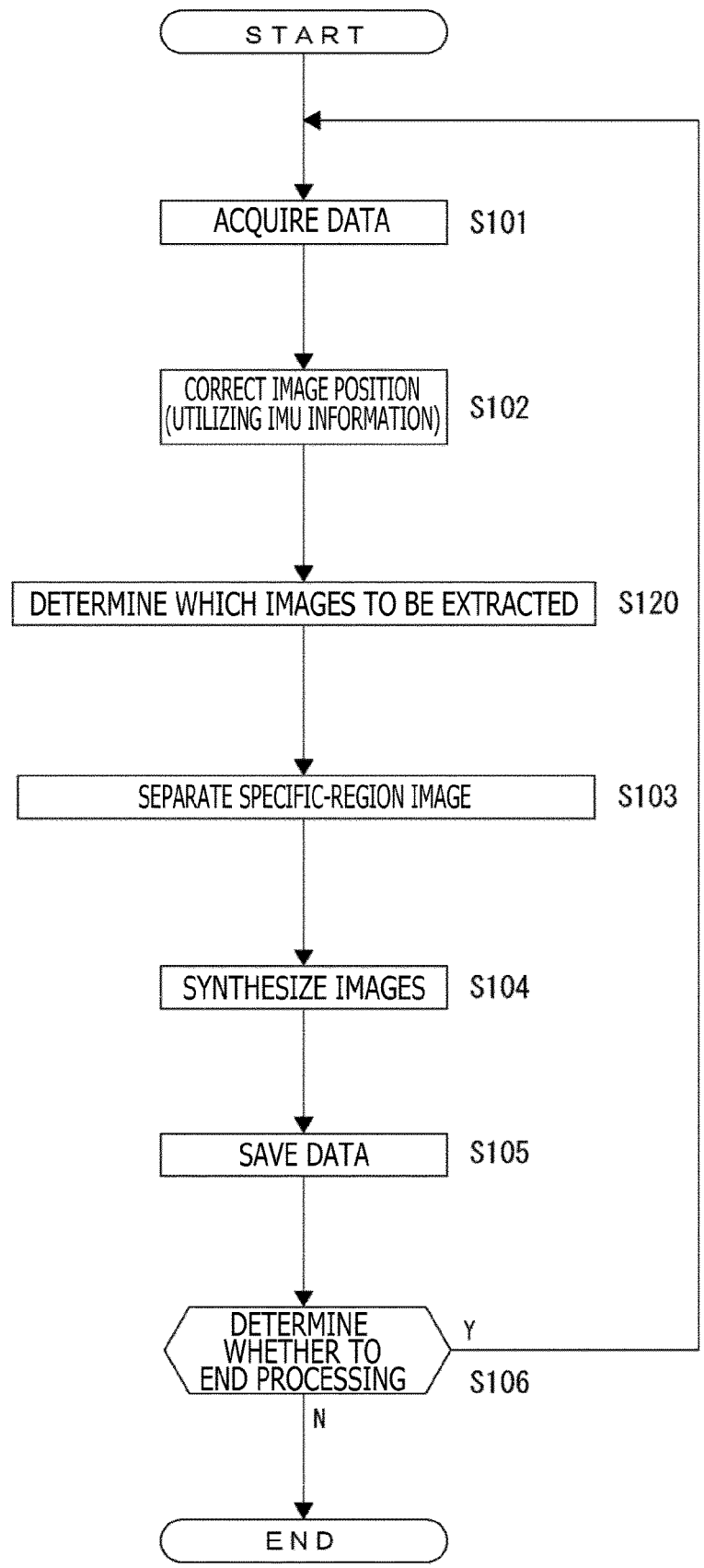
FIG. 12 is a flowchart of image processing in a third embodiment.

FIG. 10 illustrates an example of processing executed by the information processing device 10 of the present embodiment configured to obtain such a synthetic image, that is, the processing executed by the extraction section 1 and the synthesis section 2. The processing is actually an example of processing executed by the signal processing section 45 of the camera unit 20 in FIG. 2, the signal processing device 51 in FIG. 3, or the server 64 in FIG. 4, which functions as the information processing device 10. Note that this also applies to examples of processing according to a second embodiment and a third embodiment described below (FIG. 11 and FIG. 12).

In step S101 in FIG. 10, the information processing device 10 acquires data. Specifically, in this processing, a captured image is acquired at each point in time.

In step S102, the information processing device 10 corrects image positions. Here, orientation information (IMU: Inertial Measurement Unit) regarding the flying object 300 is utilized to correct distortion of the image in accordance with the incident angle of the image.

In step S103, the information processing device 10 performs image separation, that is, extracts images of the specific regions. For example, in the above-described example, the following images are separated and extracted from each captured image: an image (image of the incident-angle range θ1) of an image region with a small incident angle (corresponding to an area substantially directly below) and an image (image of the incident-angle range θ2) of an image region with a large incident angle (corresponding to an area on a screen in the traveling direction).

In step S104, the information processing device 10 synthesizes the images.

That is, the information processing device 10 collects images of the incident-angle range θ1 captured at the different points in time, and stitch processing is executed on the images arranged in order of a point in time of imaging as illustrated in FIG. 9A to generate a stitch image of the image region with the small incident angle (corresponding to the area substantially directly below). Additionally, the information processing device 10 collects images of the incident-angle range θ2 captured at the different points in time, and stitch processing is executed on the images arranged in order of a point in time of imaging as illustrated in FIG. 9B to generate a stitch image of the image region with the large incident angle (corresponding to the area obliquely below as viewed in the traveling direction). Thus, two stitch images are obtained.

In step S105, the information processing device 10 saves generated synthetic image data, and in step S106, determines whether to end the processing.

In a case of further executing the processing, the information processing device 10 returns from step S106 to step S101 and transitions to processing using other captured images. In a case of ending the processing, the information processing device 10 ends the series of processing steps in step S106.

The above-described processing results in synthetic images of the specific regions collected from the captured images captured at the different points in time. As the specific regions, the incident-angle ranges θ1 and θ2 are assumed. However, obviously, such a limitation is not intended. For example, only the incident-angle range θ1 is designated as a specific region, and one synthetic image may be generated.

Additionally, three or more incident-angle ranges θ1, θ2, θ3, . . . may be designated as specific regions, and three or more synthetic images may be generated.

The incident-angle ranges θ1 and θ2 are completely different from each other. However, the incident-angle ranges θ1 and θ2 may partly overlap each other.

Additionally, the specific region need not necessarily be determined on the basis of the incident-angle range θ1. For example, the specific region may be set as an area range on imaging elements of the image sensor 44. The specific region may be determined to be, for example, a central area on an array of imaging elements.

Additionally, a range of imaging pixels (pixels) in the captured image region may be set both in the horizontal direction and in the vertical direction as the specific region.

In any case, a part of the captured image is only required to set as the specific region.

Note that, in a case where the calculation section 3 is provided as the information processing device 10, for example, after step S106, calculation processing may be executed using synthetic images.

In that case, the calculation section 3 may calculate the density of the plants using a synthetic image of images as viewed from substantially directly above as illustrated in FIG. 7A, and calculate the density of the plants using a synthetic image of images of a region (range with a large incident angle) located eccentrically on the left or right side (or upper or lower side) of the angle of view as viewed from the center of the angle of view as illustrated in FIG. 7B.

4. SECOND EMBODIMENT

An example of processing of a second embodiment will be described with reference to FIG. 11. The same processing steps as the corresponding processing steps in FIG. 10 are denoted by the same step numbers, and duplicate description is avoided.

The example of processing in FIG. 11 corresponds to the above-described processing in FIG. 10 to which step S110 is added.

After performing image synthesis in step S104, the information processing device 10 executes map image processing in step S110.

This process involves superimposing the stitched image on a map image utilizing GPS information to match the stitched image with accurate positional information.

An image with a large incident angle is misaligned with the GPS, and thus, with this also taken into account, the image is superimposed on the map image. This provides synthetic images reflecting accurate positions.

5. THIRD EMBODIMENT

An example of processing in the third embodiment will be described with reference to FIG. 12. The same processing steps as the corresponding processing steps in FIG. 10 are denoted by the same step numbers, and duplicate description is avoided. FIG. 12 corresponds to the above-described processing in FIG. 10 to which step S120 is added.

In step S120, the information processing device 10 determines images to be extracted. This processing involves setting specific regions. In other words, this processing involves setting which regions are extracted from the captured images captured at the different points in time in step S101.

For example, in step S120, the information processing device 10 executes processing of determining certain image regions to be specific regions on the basis of each captured image and performing adaptive switching for the image regions.

That is, before separating an image region with a small incident angle and an image region with a large incident angle, the information processing device 10 determines, on the basis of each captured image, what images are to be cut out.

For example, the plants vary in length according to species. Even at a small incident angle, longer plants allow acquisition of images representing only the vegetation.

Thus, for example, for long plants, an image region for the area directly below (the angle of incidence on the center of the image is 0 degrees) is selected as the incident-angle range θ1, and an "image region near an incident angle of X degrees" is selected as the incident-angle range θ2.

For short plants, the image region for the area directly below is also selected as the incident-angle range θ1, and an "image region near an incident angle of Y degrees" is selected as the incident-angle range θ2. Here, a relationship between the incident angle X and the incident angle Y is incident angle X<incident angle Y.

In an image of the farm field 100 represented in the captured image, portions of plant leaves are easily discriminated from portions of soil by image analysis. In that case, when the image region for the area directly below includes many portions of soil, the plants can be determined to be short. When the image region for the area directly below includes few portions of soil, the plants can be determined to be long.

For example, such a method can be used to determine the length of the plants and to switch the setting of the specific regions as described above.

In this case, for long plants, an image with as small an incident angle as possible is also selected as the image with the incident-angle range θ2. Accordingly, with image distortion suppressed, the condition and activity of the vegetation can be determined.

In another specific example of processing in step S120, the incident angle at which the plants fall under shadow and the incident angle at which the plants are kept in the sun are identified according to the condition of sunlight. Then, the specific regions can be set so as to extract only images with the respective incident angles.

The spectrum of sunlight varies between an image of the plants under shadow and an image of the plants in the sun, and thus, correction needs to be performed according to the sunlight spectrum, and the present embodiment facilitates such correction.

Additionally, a stress condition of the vegetation varies between the state in the sun and the state under shadow, and thus, measuring this difference enables the stress condition to be determined.

In this case, when a region of the plants in the sun and a region of the plants under shadow remain substantially unchanged among the captured images captured at the different points in time by the flying object 300 flying, the incident-angle ranges θ1 and θ2 may be set in the single captured image as the specific region. For example, this applies to the following case: a position where the plants are normally in the sun and a position where the plants are normally under shadow are determined on the basis of surrounding terrains, and in a relative relationship with the flying object 300, the position of the plants in the sun and the position of the plants under shadow reflected in the captured image remain substantially unchanged.

On the other hand, the ranges of the plants in the sun and the plants under shadow may vary among the captured images captured at the different points in time according to traveling of the flying object 300. Thus, the specific regions may be variably set for each captured image.

That is, the image region of the plants in the sun is designated as a first specific region, and the image region of the plants under shadow is designated as a second specific region.

For example, in each captured image, a brightness distribution, a lightness distribution, and the like are determined for the image regions, and the region of the plants in the sun and the region of the plants under shadow are thus determined and then extracted as the first and second specific regions.

In this way, even in a case where the region of the plants in the sun and the region of the plants under shadow vary among the captured images, a synthetic image can be obtained by collecting images representing only the plants in the sun or images representing only the plants under shadow.

Additionally, the amount of specular reflection from the plants varies according to the position of the sun, the angle of the object, and the angle of incidence on the camera unit 20. To sense the vegetation condition, the amount of specular reflection needs to be reduced as much as possible. Thus, in another effective example, an incident angle involving the smallest amount of specular reflection is identified according to the species of the plants and the degree of growth and images with the incident angle are collected.

As illustrated in FIG. 13A, the leaves of tomatoes and the like often face relatively upward. In a direction in which light from a light source is regularly reflected (specular reflection), the angle of incidence on a substance is equal to the angle of reflection from the substance. Accordingly, tomatoes have a relationship as illustrated in FIG. 13B. That is, light from the sun 400 is reflected in the opposite direction in a state such that an incident angle AG1 is equal to a reflection angle AG2.

Figure 14:
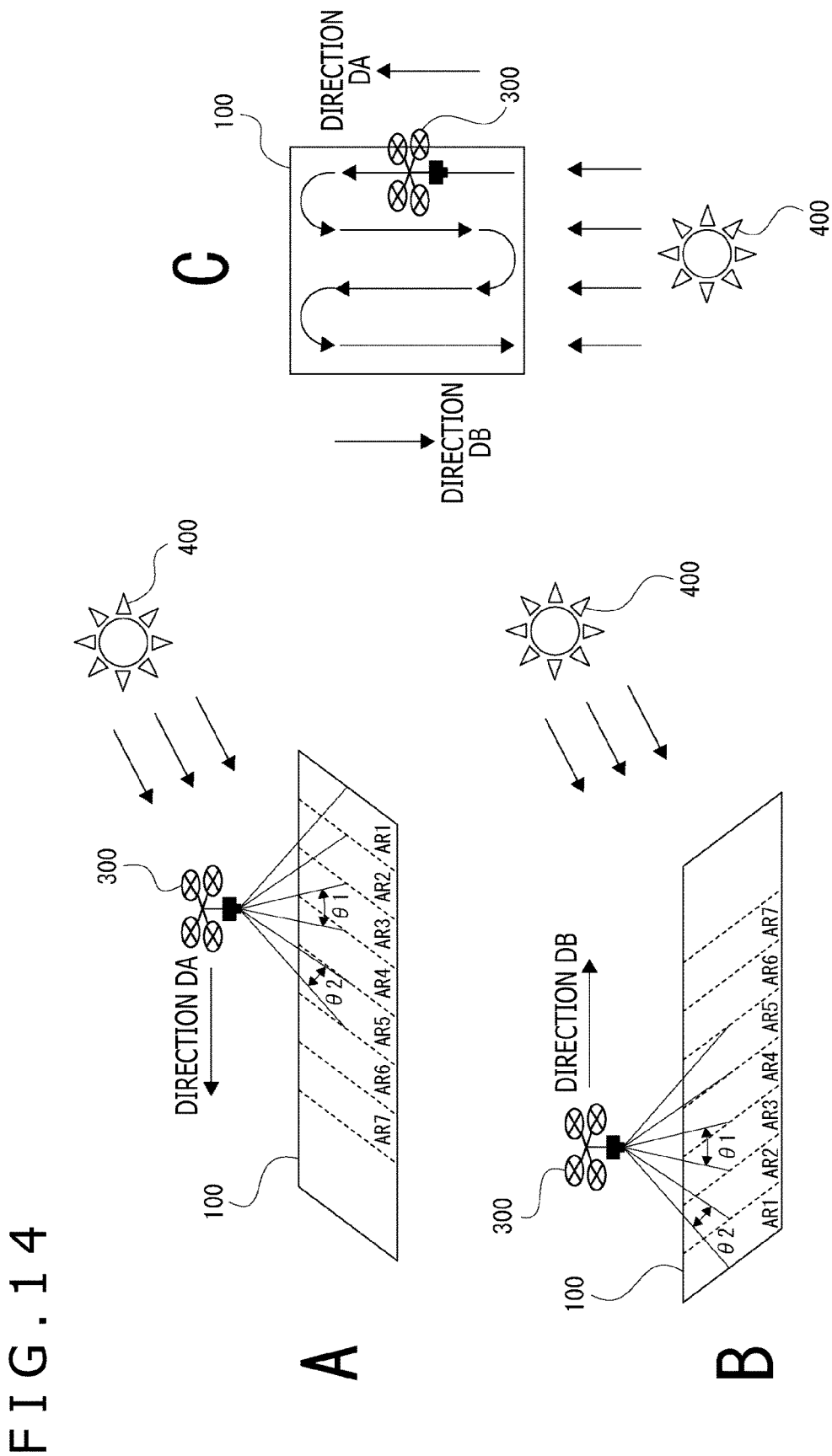
FIG. 14 is a descriptive diagram of an image extracted in the third embodiment.

FIG. 14A and FIG. 14B illustrate that the flying object 300 flies in directions DA and DB with respect to the farm field 100. Direction DA refers to the direction in which the flying object 300 travels with the sun 400 shining in the background, and direction DB refers to the direction in which the flying object 300 travels toward the sun 400.

Now, a case is considered in which the flying object 300 flies over the farm field 100 as illustrated in FIG. 14C. When the flying object 300 flies in the direction DA, an upper side of a captured image (image of the traveling direction of the flying object 300: see FIG. 14A) is used as an extracted image of the incident-angle range θ2. In contrast, when the flying object 300 flies in the direction DB, a lower side of the captured image (image of a direction opposite to the traveling direction of the flying object 300: see FIG. 14B) is used as an extracted image of the incident-angle range θ2. This allows collection of images with a reduced amount of specular reflection.

Note that an image of the area directly below (incident-angle range θ1) involves a larger amount of specular reflection than an image of the incident-angle range θ2 but can be effectively used to estimate a difference in vegetation depending on the angle by being acquired simultaneously with the image of the incident-angle range θ2.

Additionally, in a case of lawns and the like, many of the leaves stand upward as illustrated in FIG. 15A, and specular reflection of light from the sun 400 is often as illustrated in FIG. 15B.

Figure 16:
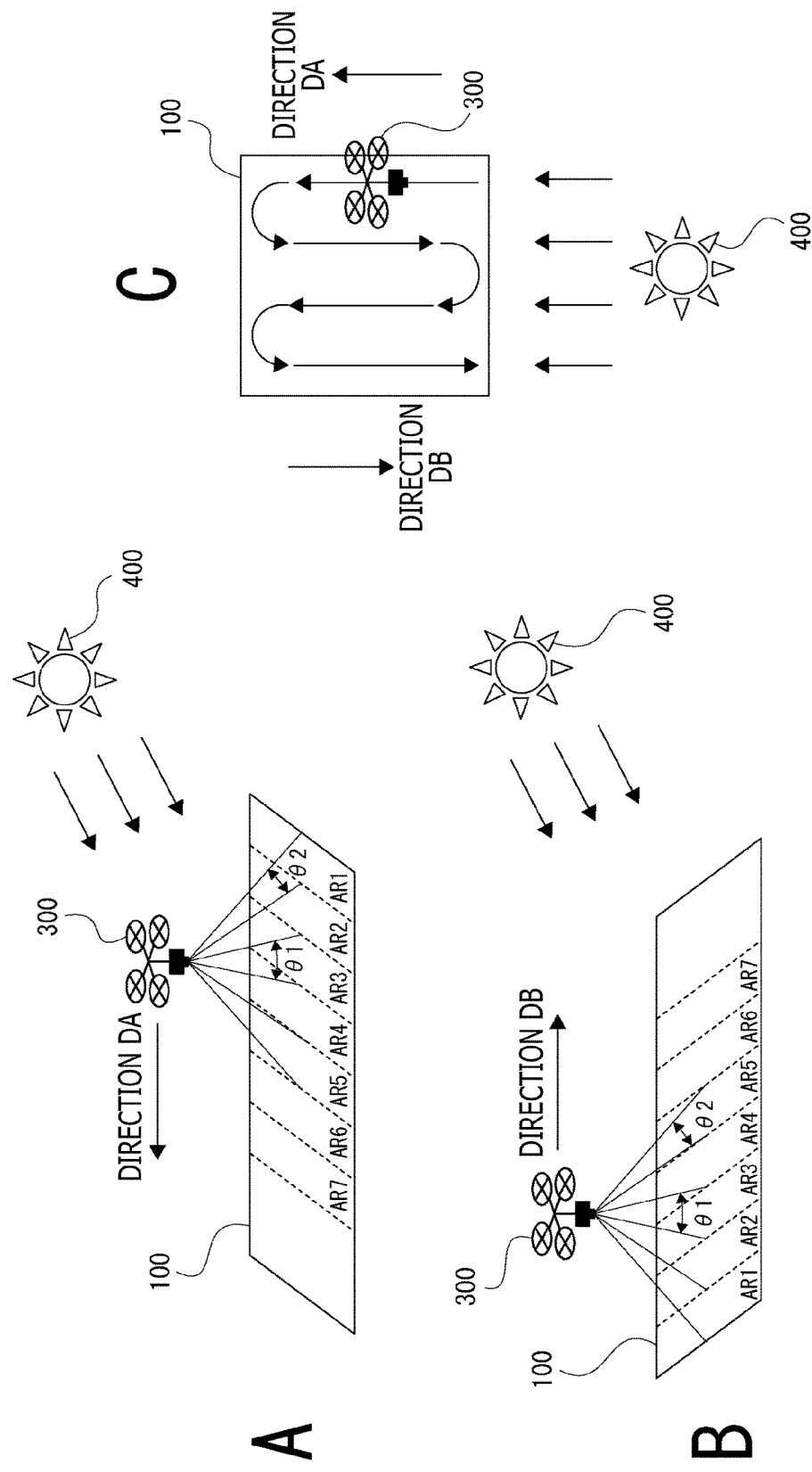
FIG. 16 is a descriptive diagram of an image extracted in the third embodiment.

In such a case, images extracted as the incident-angle range θ2 may be acquired as illustrated in FIG. 16A and FIG. 16B. Note that, like FIG. 14C, FIG. 16C illustrates a flight path of the flying object 300 over the farm field 100.

As illustrated in FIG. 16A, when the flying object 300 flies in the direction DA, the lower side of a captured image (image of the direction opposite to the traveling direction of the flying object 300) is used as an extracted image of the incident-angle range θ2. In contrast, when the flying object 300 flies in the direction DB, the upper side of the captured image (image of the traveling direction of the flying object 300) is used as an extracted image of the incident-angle range θ2 as illustrated in FIG. 16B.

As described above, a technique can also be used in which, depending on the state of the captured image, the incident-angle range set for the specific region is adaptively switched or the region itself designated as the specific region is selected from each captured image.

Additionally, in a case where the object is clear, what incident angle is used for measurement can be predetermined, and on the basis of the incident angle, the specific region to be extracted in step S120 can be selected. That is, in step S120, processing may be executed that includes determining, on the basis of pre-input setting information, which incident angle is set for the image region designated as the specific region.

Accordingly, the staff can make case-by-case settings allowing appropriate synthetic images to be obtained, according to the type of the farm field 100, the specifies of the plants, and the like.

6. FOURTH EMBODIMENT

A fourth embodiment will be described with reference to FIG. 17.

In this example, a plurality of camera units 20 is used according to the incident angle.

Like FIG. 8C, FIG. 8D, and FIG. 8E described above, FIG. 17A, FIG. 17B, and FIG. 17C illustrate the manner of imaging at points in time t3, t4, and t5.

In this example, the flying object 300 is equipped with the two camera units 20A and 20B as illustrated in FIG. 17D. The imaging direction of the camera unit 20A corresponds to the area directly below, and the imaging direction of the camera unit 20B corresponds to the area obliquely below in the traveling direction of the flying object 300. That is, the imaging direction of the camera unit 20B is intended for a range within which the incident angle is excessively large for the camera unit 20A.

In other words, in this example, the specific region is defined as the incident-angle range θ1 near the optical axis J in the camera unit 20A (see FIG. 1B). Then, an image of the image region of the incident-angle range θ1 is extracted from each of the captured images captured at the different points in time by the camera unit 20A, and the resultant images are synthesized to generate a first synthetic image.

Additionally, for the camera unit 20B, the incident-angle range θ1 near the optical axis J (see FIG. 1B) is also designated as the specific region. Then, an image of the image region of the incident-angle range θ1 is extracted from each of the captured images captured at the different points in time by the camera unit 20B, and the resultant images are synthesized to generate a second synthetic image.

Then, the first synthetic image and the second synthetic image are images of the area directly below and the area obliquely below as viewed in the traveling direction as in the case of FIG. 7A and FIG. 7B.

However, in this case, a synthetic image of the area obliquely below in the traveling direction is also obtained by collecting images of the range of small incident angles captured by the camera unit 20B. In other words, the synthetic image suffers less lens distortion.

By using camera center images from the two camera units 20A and 20B to generate a synthetic image as described above, the incident angle and the angle of view can be reduced to provide high-quality synthetic images with reduced lens distortion.

7. FIFTH EMBODIMENT

Figure 18:
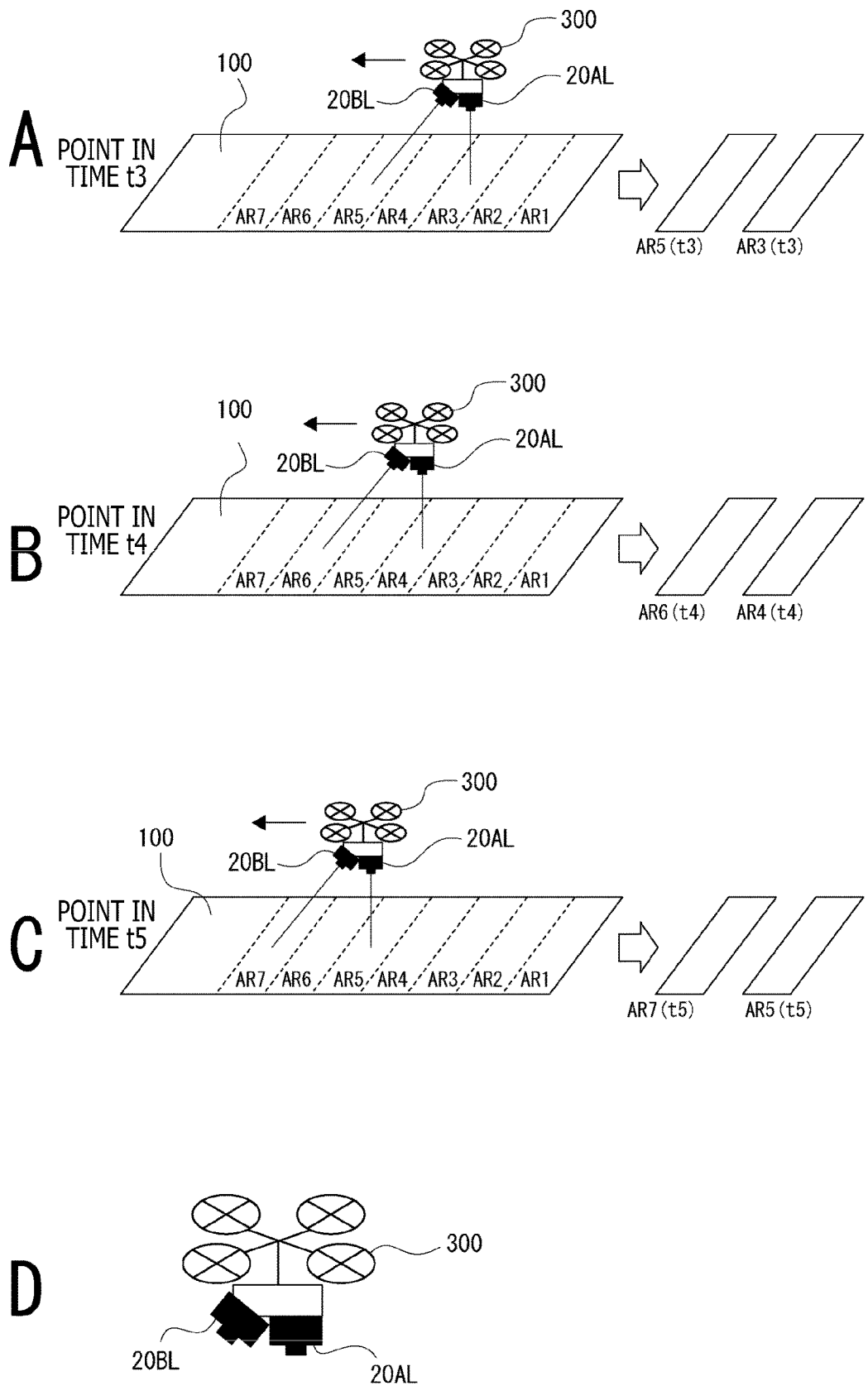
FIG. 18 is a descriptive diagram of imaging and extraction of a specific region in a fifth embodiment.

A fifth embodiment will be described with reference to FIG. 18.

Like FIG. 8C, FIG. 8D, and FIG. 8E described above, FIG. 18A, FIG. 18B, and FIG. 18C illustrate the manner of imaging at the points in time t3, t4, and t5.

In this case, the flying object 300 is equipped with the line sensor-type camera units 20AL and 20BL as illustrated in FIG. 18D. The imaging direction of the camera unit 20AL corresponds to the area directly below, and the imaging direction of the camera unit 20BL corresponds to the area obliquely below in the traveling direction of the flying object 300.

Each of the line sensor-type camera units 20AL and 20BL includes light receiving elements arranged as one-dimensional lines so as to form the image sensor 44, and captures images on a line-by-line basis, with the position relative to the object varied. Images are captured on a line-by-line basis as the flying object 300 travels to obtain captured images representing the farm field 100 as viewed from above.

In this case, captured images captured at different points in time by the camera unit 20AL are obtained using substantially the same incident angle for the entire image and correspond to the area directly below.

Additionally, captured images captured at the different points in time by the camera unit 20BL are obtained using substantially the same incident angle for the entire image and correspond to the area obliquely below in the traveling direction.

Then, a synthetic image is obtained using the captured images captured at the different points in time by the camera unit 20AL, and a synthetic image is also obtained using the captured images captured at the different points in time by the camera unit 20BL. Thus, synthetic images are easily obtained in which images for all the lines are captured at the same angle.

8. CONCLUSION AND MODIFIED EXAMPLES

The above-described embodiments produce the following effects.

An information processing device 10 of the embodiments includes an extraction section 1 acquiring a captured image including information regarding a specific wavelength region and extracting an image of a specific region corresponding to a specific positional range in a captured image and a synthesis section 2 synthesizing a plurality of images of the specific region extracted by the extraction section 1 from respective captured images captured at different points in time to generate a synthetic image. That is, an image of the same image region in each captured image is extracted from each of the captured images captured at the different points in time, and the resultant images of the same image region are synthesized.

Accordingly, images can be obtained that have few errors and that are suitable for quantizing measurement results into sensing data.

For example, a laterally central portion of each captured image is set as the specific region. In that case, a synthetic image can be obtained by collecting images in which the angle to the imaging device (for example, the angle of incidence of object light on the imaging element) is within substantially the same range.

In a case where imaging is performed with the imaging device being moved, captured images within a movement range can be obtained as images with the position relative to the imaging device remaining substantially the same.

For example, the amount of information involved in the manner of using parallax images of plants to create orthographic images is small compared to the complexity of the plants, and thus, difficulty lies in achieving conversion into images of the plants as viewed from directly above. Thus, this method involves many errors and instability in a case where the measurement results are quantified into sensing data. The method is thus insufficient. In contrast, the embodiments facilitate acquisition of an image entirely representing the plants as viewed from directly above (see FIG. 7A) without a need for major conversion leading to errors, and is thus very suitable for sensing of the vegetation condition.

In the example described in each of the embodiments, the specific region is an image region in which the angle of incidence of object light on an image sensor 44 of a camera unit 20 is in a specific incident-angle range. Then, an image of the image region of the same incident-angle range is extracted from each of the captured images captured at the different points in time, and the resultant images of the image region of the same incident-angle range are synthesized.

Accordingly, in a case where the camera unit 20 captures images while being moved by the flying object 300, a synthetic image can be obtained by collecting images of the image region captured using object light with substantially the same incident angle.

For example, by collecting and synthesizing only images with the smallest angle of incidence on the imaging elements, images with reduced distortion can be obtained.

Additionally, for example, collecting and synthesizing only images of a region with a large incident angle provides images as entirely obliquely viewed.

In the first embodiment, the extraction section 1 executes processing of extracting, from the captured image, an image of a first specific region (image of the incident-angle range θ1) and an image of a second image region (image of the incident-angle range θ2). Then, in the described example, the synthesis section 2 executes processing of synthesizing a plurality of images of the first specific region extracted from respective captured images captured at the different points in time to generate a first synthetic image and processing of synthesizing a plurality of images of the second specific region extracted from the respective captured images captured at the different points in time to generate a second synthetic image. In other words, a plurality of synthetic images is generated from the captured images captured at the different points in time. Each of the synthetic images is an image corresponding to a collection of images of the specific positional range in the captured image, for example, images of the image region of the same incident-angle range.

Accordingly, for example, a plurality of synthetic images can be generated in which images of similar incident-angle ranges are collected. For example, as a synthetic image of the image region of the incident-angle range θ1, a captured image of the farm field 100 as viewed directly below from the camera unit 20 can be generated. At the same time, a captured image of the farm field 100 as viewed obliquely below from the camera unit 20 can be generated.

Images with different incident angles may be suitable for various observations and analyses. Thus, obtaining various incident-angle images at a time is very suitable for remote sensing of the vegetation condition.

Obviously, furthermore, three or more synthetic images can be generated, for example, a plurality of images of a third specific region extracted by the extraction section is synthesized to generate a third synthetic image.

Additionally, collecting images corresponding to the different incident angles allows the condition of the plants to be evaluated from different angles. For example, an image constituted of images as viewed from directly above is suitable for observing the density of the plants on the basis of, for example, soil portions in the image and according to the growth of the plants. Collecting images of the plants as obliquely viewed allows the plants to be focused on, and the resultant image is suitable for observing the condition and activity of the plants.

In the example described according to the first embodiment, the extraction section 1 extracts, as an image of the specific region (image of the incident-angle range θ1), an image of an image region in which the angle of incidence of object light on the image sensor 44 of the camera unit 20 is in a range of ±angle a1 from a lens system optical axis J (see FIG. 1B). In other words, an image of the image region of the center of the angle of view (range in the center of the visual field in which the incident angle is small) in the captured image is extracted, and the resultant images of the image region are collected to generate a plurality of synthetic images.

The image in the center of the angle of view suffers less image distortion. Accordingly, a synthetic image of a wide range in the object (for example, the farm field) is obtained as an image with less distortion. Such a synthetic image is suitable for analysis or observation of vegetation information based on a scheme susceptible to image distortion.

For example, as the synthetic image as illustrated in FIG. 7A (first incident-angle image), a stable and accurate image is obtained due to the lack of unreasonable image conversion. Additionally, the synthetic image in FIG. 7A is constituted of an image as viewed from directly above and thus represents soil portions, allowing the density of the plants to be observed.

In the example described according to the first embodiment, the extraction section 1 extracts, as an image of the specific region (image of the incident-angle range θ2), an image of an image region in which the angle of incidence of object light on the image sensor 44 of the camera unit 20 is in a range of more than or equal to a first angle a3 and less than or equal to a second angle a4 from the lens system optical axis J (see FIG. 1B).

In other words, the specific region is a region (range with a large incident angle) located eccentrically on the left or right side (or upper or lower side) of the angle of view in the image as viewed from the center of the angle of view. In other words, the region is located close to an edge portion of the angle of view. Images of such an image region are extracted and collected to generate a plurality of synthetic images.

An image close to the edge portion of the angle of view is an image as obliquely viewed. Given images of the farm field, the soil portions are likely to be hidden by plant leaves in the image. Thus, an image suitable for vegetation analysis and observation can be obtained such that the soil portions of the image represent noise to the analysis.

For example, the synthetic image as illustrated in FIG. 7B (second incident-angle image) is a collection of images of the plants as obliquely viewed, allowing only the condition and activity of the plants to be observed.

In each of the embodiments, the synthesis section 2 arranges, in order of a point in time of imaging, a plurality of images of the specific region extracted by the extraction section 1 and executes stitch processing on the images to generate a synthetic image (see FIG. 9A and FIG. 9B).

By using the imaging device to capture images at different points in time, while moving the imaging device, a plurality of captured images intended for a wide range can be obtained. An image of the specific region is extracted from each of the captured images, the resultant images are arranged in a temporal order, and stitch processing is executed on the images.

For example, as images for a wide range in the farm field, images with similar ranges of the angle of incidence of the object light can be obtained and are suitable for vegetation analysis of a wide range.

In the example described in the second embodiment, the synthesis section 2 executes processing using positional information, on the image resulting from the stitch processing. For example, the synthesis section 2 executes processing of superimposing, on a map image, the image resulting from the stitch processing utilizing GPS information added to the captured images.

This allows acquisition of synthetic images with accurate positional relationships.

In the fourth embodiment, the extraction section 1 executes processing of extracting an image of a specific region from each of first captured images captured at different points in time by a camera unit 20A and processing of extracting an image of a specific region from each of second captured images captured at the different points in time by a camera unit 20B. Additionally, the synthesis section 2 executes processing of synthesizing the images of the specific region extracted from the first captured images captured at the different points in time to generate a first synthetic image and processing of synthesizing the images of the specific region extracted from the second captured images captured at the different points in time to generate a second synthetic image.

In other words, the fourth embodiment is directed to captured images captured by a plurality of imaging devices (camera unit 20). An image of the specific region is extracted from each of the captured images captured at the different points in time by each of the imaging devices, and the resultant images are synthesized to generate a synthetic image.

In this case, the synthetic image can be generated by collecting images of a specific incident-angle range from the captured images captured at the different points in time by each of the plurality of camera units 20A and 20B.

For example, as described with reference to FIG. 17, the camera unit 20A is set to face an area directly below the flying object 300, and the camera unit 20B is set to face an area obliquely below the flying object 300 to allow captured images to be obtained over a wide range. Then, by setting the imaging direction of the camera unit 20A or selecting the specific region for extraction, acquisition of suitable images according to the intended use such as sensing of the vegetation condition can be facilitated.

Note that a larger number of the camera units 20 (for example, an unillustrated camera unit 20C in addition to the camera units 20A and 20B) can obviously be used to extract images of the specific region from the captured images and to obtain a synthetic image.

Additionally, even with a plurality of the camera units 20, images of a plurality of specific regions (first specific region and second specific region) may be extracted and synthesized to generate respective synthetic images. For example, a total of four synthetic images can be generated at a time by setting a first and a second specific regions for the captured image captured by the camera unit 20A to generate two synthetic images, and setting a first and a second specific regions for the captured image captured by the camera unit 20B to generate two synthetic images.

Additionally, in the example described in the fourth embodiment, the extraction section 1 extracts, as an image of the specific region, an image of an image region (incident-angle range θ1) in which the angle of incidence of the object light is less than or equal to a predetermined angle from the lens system optical axis J, both from each of the captured images captured by the camera unit 20A and from each of the captured images captured by the camera unit 20B. That is, an image of the image region of the center of the angle of view in the captured image (range in the center of the visual field in which the incident angle is small) is extracted from each of the captured images captured by each of the camera units 20A and 20B, and the resultant images of the image region of the center of the angle of view are collected to generate a plurality of synthetic images.

The image of the center of the angle of view suffers less image distortion. Accordingly, a synthetic image of a wide range in the object (for example, the farm field) is obtained as an image with less distortion.

For example, as illustrated in FIG. 17, in a case where the camera unit 20A is set to face the area directly below the flying object 300, and the camera unit 20B is set to face the area obliquely below the flying object 300, as an image of the range of a small incident angle (range close to the optical axis) for both camera units, an image of the visual field for the area directly below and an image of the visual field for the area obliquely below can be obtained. In other words, as an image with little image distortion for both camera units, an image of the area directly below and an image of the area obliquely below can be obtained.

In the example described in the third embodiment, in the processing in step S120 in FIG. 12, the extraction section 1 sets the specific region according to the captured image. That is, the extraction section 1 determines, according to the captured image, which region is to be cut out from the captured image as the specific region.

Accordingly, a synthetic image can be obtained by extracting the specific region corresponding to the intended use of sensing of the farm field 100 or the like. For example, the specific region can be set according to an irradiation state of the sunlight.

Additionally, in the processing in step S120 according to the third embodiment, the extraction section 1 may determine a region in a specific image state for each of the captured images captured at the different points in time and set the determined region as the specific region. That is, the specific region is variably set according to the image state (for example, brightness or the like) of each portion of each captured image.

Accordingly, even in a case where the irradiation state of the sunlight varies among the captured images, the specific region can be set to accurately separate, for example, the plants under shadow from the plants in the sun.

Additionally, in the processing in step S120 according to the third embodiment, the extraction section 1 may set the specific region according to selection information preset by the user. In other words, which area of the captured image is to be set as the specific region depends on a selection operation performed by the user.

Accordingly, a synthetic image can be obtained by extracting the specific region corresponding to the intended use of sensing of the farm field or the like. For example, the user can pre-select the specific region according to the species of the plants.

In the example described in the fifth embodiment, the extraction section 1 executes processing of extracting images of the specific region from the captured images captured at the different points in time by line sensor-type camera units 20AL and 20BL. Each of the line sensor-type imaging devices includes light receiving elements arranged as one-dimensional lines, and thus, for the captured images, the angles of incidence on the lines are similar. Accordingly, a synthetic image is easily obtained that is generated by the object light incident on all the lines at the same incident angle.

As illustrated by the configuration example in FIG. 2, FIG. 3, and FIG. 4, a calculation section 3 may be provided that calculates the vegetation condition of the plants using synthetic images.

The extraction section 1 extracts, as an image of the specific region (image of the incident-angle range θ1), an image of an image region in which the angle of incidence of the object light on the image sensor 44 of the camera unit 20 is in a range of ±angle a1 from the lens system optical axis J (see FIG. 1B), and the synthesis section 2 synthesizes a plurality of images of the specific region extracted by the extraction section 1 from respective captured images captured at the different points in time to generate a synthetic image. In this case, the calculation section 3 uses a synthetic image of images as viewed from substantially directly above to calculate the density of the vegetation.

For example, as the synthetic image as illustrated in FIG. 7A (first incident-angle image), a stable and accurate image is obtained due to the lack of unreasonable image conversion. Additionally, in addition to the plants, the image represents portions other than the plants, such as soil. Accordingly, the calculation section 3 can appropriately calculate the vegetation condition. The vegetation condition refers to, for example, the density (degree of congestion) of the plants and the variance of one or more specifies of plants.

Additionally, the extraction section 1 extracts, as an image of the specific region (image of the incident-angle range θ2), an image of an image region in which the angle of incidence of the object light on the image sensor 44 of the camera unit 20 is in a range of more than or equal to a first angle a3 and less than or equal to a second angle a4 from the lens system optical axis J (see FIG. 1B), and the synthesis section 2 synthesizes a plurality of images of the specific region extracted by the extraction section 1 from respective captured images captured at the different points in time to generate a synthetic image. In this case, the calculation section 3 calculates the density of the plants using a synthetic image of images of a region (range with a large incident angle) located eccentrically on the left or right side (or upper or lower side) of the angle of view in the image as viewed from the center of the angle of view.

For example, as the synthetic image as illustrated in FIG. 7B (second incident-angle image), an image suitable for vegetation analysis and observation is obtained such that the soil portions of the image represent noise to the analysis. Thus, the calculation section 3 can use such a synthetic image to accurately calculate vegetation indexes such as PRI.

Note that, in each of the embodiments, the extraction section 1 and the synthesis section 2 executes processing on the captured image. However, the "captured image" as used in the present technique includes all of the information expressed by signals obtained by photoelectric converting elements. For example, the captured image is not limited to narrowly defined images directly expressing visible light.

A program according to an embodiment of the present invention is a program for causing a CPU 151 of a computer device 150 to execute an extraction step (S103) of extracting an image of a specific region in a captured image and a synthesis step (S104) of synthesizing a plurality of images of the specific region extracted in the extraction step from respective captured images captured at different points in time.

More specifically, the program causes the CPU 151 of the computer device 150 to execute the processing in FIG. 10, FIG. 11, or FIG. 12.

Such a program facilitates implementation of the information processing device 10 of the present embodiment.

Such a program can be stored, for example, in a recording medium built in equipment such as a computer device, or a ROM in a microcomputer including a CPU. Alternatively, such a program can be temporarily or permanently stored (memorized) in a removable recording medium such as a semiconductor memory, a memory card, an optical disc, a photomagnetic disk, or a magnetic disk. Additionally, such a removable recording medium can be provided as what is called package software.

Additionally, such a program can be installed from the removable recording medium into a personal computer or the like or downloaded from a download site via a network such as a LAN or the Internet.

Note that the effects described herein are only illustrative and are not restrictive and that any other effect may be produced.

Note that the present technique can be configured as follows.

(1)
An information processing device including:
an extraction section extracting an image of a specific region in an acquired image including information regarding a specific wavelength region, and
a synthesis section synthesizing a plurality of images of the specific region extracted by the extraction section from respective acquired images acquired at different points in time to generate a synthetic image.

(2)
The information processing device described above in (1), in which
the extraction section extracts images of the specific region in the acquired images as captured images captured by an imaging device.

(3)
The information processing device described above in (2), in which
the specific region includes an image region in which an angle of incidence of object light on an imaging element of the imaging device is in a specific incident-angle range.

(4)
The information processing device described above in (2) or (3), in which
the extraction section executes processing of extracting an image of a first specific region and an image of a second specific region from captured images, and
the synthesis section executes:
processing of synthesizing a plurality of images of the first specific region extracted by the extraction section from respective captured images captured at different points in time to generate a first synthetic image, and
processing of synthesizing a plurality of images of the second specific region extracted by the extraction section from respective captured images captured at the different points in time to generate a second synthetic image.

(5)
The information processing device described above in any one of (2) to (4), in which
the extraction section extracts, as an image of the specific region, an image of an image region in which the angle of incidence of the object light on the imaging element of the imaging device is less than or equal to a predetermined angle from a lens system optical axis.

(6)
The information processing device described above in any one of (2) to (5), in which
the extraction section extracts, as an image of the specific region, an image of an image region in which the angle of incidence of the object light on the imaging element of the imaging device is more than or equal to a first angle and less than or equal to a second angle from the lens system optical axis.

(7)
The information processing device described above in any one of (2) to (6), in which
the synthesis section arranges, in order of a point in time of imaging, a plurality of images of the specific region extracted by the extraction section and executes stitch processing on the images to generate a synthetic image.

(8)
The information processing device described above in (7), in which
the synthesis section executes processing using positional information on an image resulting from the stitch processing.

(9)

The information processing device described above in any one of (2) to (8), in which the extraction section executes processing of extracting images of the specific region from first captured images captured at different points in time by a first imaging device, and processing of extracting images of the specific region from second captured images captured at different points in time by a second imaging device; and the synthesis section executes processing of synthesizing the images of the specific region extracted from the first captured images captured at the different points in time to generate a first synthetic image, and processing of synthesizing the images of the specific region extracted from the second captured images captured at the different points in time to generate a second synthetic image.

(10)

The information processing device described above in (9), in which the extraction section extracts, as images of the specific region, images of an image region in which the angle of incidence of the object light on the imaging element of the imaging device is less than or equal to a predetermined angle from the lens system optical axis, both from the first captured images and from the second captured images.

(11)

The information processing device described above in any one of (1) to (10), in which the extraction section sets the specific region according to the acquired image.

(12)

The information processing device described above in any one of (2) to (10), in which the extraction section determines a region in a specific image state for each of the captured images captured at the different points in time, and sets the determined region as the specific region.

(13)

The information processing device described above in any one of (1) to (10), in which the extraction section sets the specific region according to selection information.

(14)

The information processing device described above in any one of (2) to (13), in which the extraction section executes processing of extracting images of the specific region from the captured images captured at the different points in time by a line sensor-type imaging device.

(15)

The information processing device described above in any one of (2) to (14), in which the specific region includes an image region in which the angle of incidence of the object light on the imaging element of the imaging device is less than or equal to the predetermined angle from the lens system optical axis, the synthesis section synthesizes a plurality of images of the specific region extracted by the extraction section from respective captured images captured at the different point in time to generate a synthetic image, and the information processing device includes a calculation section executing calculation of a vegetation condition of plants using the synthetic image.

(16)

The information processing device described above in any one of (2) to (15), in which the specific region includes an image region in which the angle of incidence of the object light on the imaging element of the imaging device is more than or equal to a first angle and less than or equal to a second angle from the lens system optical axis, the synthesis section synthesizes a plurality of images of the specific region extracted by the extraction section from a plurality of captured images captured at the different point in time to generate a synthetic image, and the information processing device includes a calculation section calculating a vegetation index using the synthetic image.

(17)

An information processing method executed by an information processing device, including:

an extraction procedure of extracting an image of a specific region in an acquired image including information regarding a specific wavelength region; and a synthesis procedure of synthesizing a plurality of images of the specific region extracted, during the extraction procedure, from respective acquired images acquired at different points in time to generate a synthetic image.

(18)

A program for causing a computer device to execute:

an extraction step of extracting an image of a specific region in an acquired image including information regarding a specific wavelength region; and a synthesis step of synthesizing a plurality of images of the specific region extracted, during the extraction step, from respective acquired images acquired at different points in time to generate a synthetic image.

REFERENCE SIGNS LIST

1 . . . Extraction section, 2 . . . Synthesis section, 3 . . . Calculation section, 10 . . . Information processing device, 20, 20A, 20B, 20AL, 20BL . . . Camera unit, 44 . . . Image sensor, 45 . . . Signal processing section, 51 . . . Signal processing device, 64 . . . Server, 100 . . . Farm field, 150 . . . Computer device, 300 . . . Flying object

The invention claimed is:

1. An information processing device comprising:

an extraction section extracting images of a first specific region and a second specific region in an acquired image including information regarding a specific wavelength region, first extracted images for the first specific region corresponding to a first angle of incidence to an imaging device and second extracted images for the second specific region corresponding to a second angle of incidence to the imaging device that is different from the first angle of incidence; and a synthesis section synthesizing the images extracted by the extraction section from respective acquired images acquired at different points in time to generate a synthetic image, the synthesizing of the images including a stitching of the first extracted images corresponding to the first angle of incidence in a spatial domain to generate a first synthetic image and a stitching of the second extracted images corresponding to the second angle of incidence in the spatial domain to generate a second synthetic image.

2. The information processing device according to claim 1, wherein the extraction section extracts the images of the first and second specific regions as captured images captured by the imaging device.

3. The information processing device according to claim 2, wherein
the synthesis section executes:
processing of synthesizing a plurality of images of the first specific region extracted by the extraction section from respective captured images captured at different points in time to generate the first synthetic image, and
processing of synthesizing a plurality of images of the second specific region extracted by the extraction section from respective captured images captured at the different points in time to generate the second synthetic image.

4. The information processing device according to claim 1, wherein
the first angle of incidence is less than or equal to a predetermined angle from a lens system optical axis of the imaging device.

5. The information processing device according to claim 4, wherein
the second angle of incidence is greater than the first angle of incidence.

6. The information processing device according to claim 1, wherein
the synthesis section executes processing using positional information on the images resulting from the stitch processing of the first and second extracted images.

7. The information processing device according to claim 1, wherein
the extraction section executes
processing of extracting images of the first specific region from first captured images captured at different points in time by a first camera of the imaging device, and
processing of extracting images of the second specific region from second captured images captured at different points in time by a second camera of the imaging device; and
the synthesis section executes
processing of synthesizing the images of the first specific region extracted from the first captured images captured at the different points in time to generate the first synthetic image, and
processing of synthesizing the images of the second specific region extracted from the second captured images captured at the different points in time to generate the second synthetic image.

8. The information processing device according to claim 7, wherein
the extraction section extracts, as images of the first and second specific regions, images of an image region in which the angle of incidence of the object light on imaging elements of the imaging device is less than or equal to a predetermined angle from the lens system optical axis, both from the first captured images and from the second captured images.

9. The information processing device according to claim 1, wherein
the extraction section sets the first and second specific regions according to the acquired image.

10. The information processing device according to claim 1, wherein
the extraction section sets the first and second specific regions according to selection information.

11. The information processing device according to claim 2, wherein the extraction section executes processing of extracting images of the first and second specific regions from the captured images captured at the different points in time by a line sensor-type imaging device.

12. The information processing device according to claim 1, further comprising:
a calculation section configured to calculate a first vegetation characteristic using the first synthetic image and a second vegetation characteristic using the second synthetic image, the first vegetation characteristic being different from the second vegetation characteristic.

13. An information processing method executed by an information processing device, comprising:
extracting images of a first specific region and a second specific region in an acquired image including information regarding a specific wavelength region, first extracted images for the first specific region corresponding to a first angle of incidence to an imaging device and second extracted images for the second specific region corresponding to a second angle of incidence to the imaging device that is different from the first angle of incidence; and
synthesizing the extracted images from respective acquired images acquired at different points in time to generate a synthetic image, the synthesizing of the images including a stitching of the first extracted images corresponding to the first angle of incidence in a spatial domain to generate a first synthetic image and a stitching of the second extracted images corresponding to the second angle of incidence in the spatial domain to generate a second synthetic image.

14. A non-transitory computer readable medium storing program code, the program code being executable by a computer to perform operations comprising:
extracting images of a first specific region and a second specific region in an acquired image including information regarding a specific wavelength region, first extracted images for the first specific region corresponding to a first angle of incidence to an imaging device and second extracted images for the second specific region corresponding to a second angle of incidence to the imaging device that is different from the first angle of incidence; and
synthesizing the extracted images from respective acquired images acquired at different points in time to generate a synthetic image, the synthesizing of the images including a stitching of the first extracted images corresponding to the first angle of incidence in a spatial domain to generate a first synthetic image and a stitching of the second extracted images corresponding to the second angle of incidence in the spatial domain to generate a second synthetic image.

15. The non-transitory computer readable medium according to claim 14, wherein the operations further comprise:
calculating a first vegetation characteristic using the first synthetic image and a second vegetation characteristic using the second synthetic image, the first vegetation characteristic being different from the second vegetation characteristic.

16. The method according to claim 13, further comprising:
calculating a first vegetation characteristic using the first synthetic image and a second vegetation characteristic using the second synthetic image, the first vegetation characteristic being different from the second vegetation characteristic.

\* \* \* \* \*